US012651143B2

(12) United States Patent
Shebl et al.

(10) Patent No.: US 12,651,143 B2
(45) Date of Patent: Jun. 9, 2026

(54) AUTOMATED METHOD AND SYSTEM FOR CATEGORISING AND DESCRIBING THIN SECTIONS OF ROCK SAMPLES OBTAINED FROM CARBONATE ROCKS

(71) Applicant: Abu Dhabi National Oil Company, Abu Dhabi (AE)

(72) Inventors: Hesham Shebl, Abu Dhabi (AE); Douglas Alexander Boyd, Abu Dhabi (AE); Hani Abdulla Nehaid, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 1087 days.

(21) Appl. No.: 17/609,946

(22) PCT Filed: May 9, 2019

(86) PCT No.: PCT/IB2019/053811
§ 371 (c)(1),
(2) Date: Nov. 9, 2021

(87) PCT Pub. No.: WO2020/225592
PCT Pub. Date: Nov. 12, 2020

(65) Prior Publication Data
US 2022/0207079 A1     Jun. 30, 2022

(51) Int. Cl.
*G06N 3/045*      (2023.01)
*G06F 40/30*      (2020.01)
(Continued)

(52) U.S. Cl.
CPC ............ *G06N 3/045* (2023.01); *G06F 40/30* (2020.01); *G06N 3/044* (2023.01); *G06N 3/0442* (2023.01);
(Continued)

(58) Field of Classification Search
CPC .... G06N 3/0464; G06N 3/044; G06N 3/0442; G06N 3/08; G06N 20/00; G06N 3/045;
(Continued)

(56) References Cited

U.S. PATENT DOCUMENTS 11,068,722 B2 * 7/2021 Cricri .................... G06V 20/70
2009/0110242 A1 4/2009 Touati et al.
(Continued)

FOREIGN PATENT DOCUMENTS

CN      103207999 A      7/2013
CN      107133630 A      9/2017
(Continued)

OTHER PUBLICATIONS

Dorrington et al., "Geological Feature Search Engine" Jun. 6, 2018, U.S. Appl. No. 62/681,632. (Year: 2018).*
(Continued)

*Primary Examiner* — Miranda M Huang
*Assistant Examiner* — Chase P. Hinckley
(74) *Attorney, Agent, or Firm* — Renner, Otto, Boisselle & Sklar, LLP

(57)        ABSTRACT

An automated method for categorising and describing rock samples includes: (i) capturing images of samples to generate image data; (ii) classifying the samples by applying convolutional neural network processing to the image data to identify attributes of the samples; (iii) extracting, using a module based on a trained convolution deconvolution neural network, salient features from the attributes to generate salient feature data; (iv) applying, using a module based on a trained recurrent neural network generated from supervised learning, semantic text processing to the salient feature data to generate sample text data indicative of the attributes; (v) storing the sample text data; (vi) searching an image database for categorised images that are similar to the
(Continued)

captured images; and (vii) generating output data dependent upon a degree of similarity between the sample text data and the database text data to indicate petrophysical properties of the rocks.

14 Claims, 21 Drawing Sheets

(51) Int. Cl.

| | |
|---|---|
| *G06N 3/044* | (2023.01) |
| *G06N 3/0442* | (2023.01) |
| *G06N 3/0464* | (2023.01) |
| *G06N 3/08* | (2023.01) |
| *G06N 20/00* | (2019.01) |
| *G06V 10/764* | (2022.01) |
| *G06V 10/82* | (2022.01) |

(52) U.S. Cl.
CPC ............. *G06N 3/0464* (2023.01); *G06N 3/08* (2013.01); *G06N 20/00* (2019.01); *G06V 10/764* (2022.01); *G06V 10/82* (2022.01); *G01V 2210/1216* (2013.01)

(58) Field of Classification Search
CPC ......... G01V 2210/1216; G06V 10/764; G06V 10/82; G06F 40/30
See application file for complete search history.

(56) References Cited

U.S. PATENT DOCUMENTS

| | | | |
|---|---|---|---|
| 2012/0275658 A1 | 11/2012 | Hurley et al. | |
| 2018/0268548 A1* | 9/2018 | Lin ........................... | G06T 7/11 |
| 2019/0012791 A1 | 1/2019 | Tchoumou et al. | |
| 2019/0064378 A1* | 2/2019 | Liu .......................... | G01V 1/28 |
| 2019/0087939 A1* | 3/2019 | Hakimuddin ............. | G06T 7/11 |
| 2019/0147125 A1* | 5/2019 | Yu .......................... | G06N 3/047 |
| | | | 703/10 |
| 2019/0368316 A1* | 12/2019 | Bize-Forest ........... | G06Q 10/06 |
| 2019/0378179 A1* | 12/2019 | Cleverley .............. | G06Q 50/01 |
| 2020/0097754 A1* | 3/2020 | Tawari ................... | G06V 10/82 |
| 2020/0183031 A1* | 6/2020 | Denli ..................... | G01V 1/282 |
| 2020/0226400 A1* | 7/2020 | Corring .................. | G06V 10/82 |
| 2020/0301036 A1* | 9/2020 | Ramfjord ................ | E21B 7/04 |
| 2020/0356822 A1* | 11/2020 | Starostin ............... | E21B 49/005 |
| 2021/0166115 A1* | 6/2021 | Yu .......................... | E21B 44/00 |
| 2021/0223427 A1* | 7/2021 | Dorrington ........... | G06F 16/535 |
| 2022/0099855 A1* | 3/2022 | Li ........................... | G01V 1/345 |
| 2022/0146705 A1* | 5/2022 | Gkortsas ................ | G01V 11/00 |
| 2022/0179111 A1* | 6/2022 | Xue ........................ | G01V 1/288 |
| 2022/0207079 A1* | 6/2022 | Shebl .................... | G06N 3/0442 |

FOREIGN PATENT DOCUMENTS

| | | | |
|---|---|---|---|
| CN | 107633255 A | 1/2018 | |
| KR | 10-2019-0012791 A | 2/2019 | |
| WO | 2017/079178 A1 | 5/2017 | |
| WO | WO-2019236339 A1 * | 12/2019 | .............. G01V 1/30 |

OTHER PUBLICATIONS

Wei et al., "Characterizing Rock Facies using Machine Learning Algorithm Based on a Convolutional Neural Network and Data Padding Strategy" Mar. 25, 2019, pp. 1-13. (Year: 2019).*
Hu et al., "Segmentation from Natural Language Expressions" Mar. 20, 2016, arXiv: 1603.06180v1, pp. 1-25. (Year: 2016).*
Qi et al., "Life-long Cross-media Correlation Learning" Oct. 2018, pp. 528-536. (Year: 2018).*
Babakhin et al., "Semi-Supervised Segmentation of Salt Bodies in Seismic Images using an Ensemble of Convolutional Neural Networks" Apr. 9, 2019, arXiv: 1904.04445v1, pp. 1-9. (Year: 2019).*

Nag et al., "Offline Extraction of Indic Regional Language from Natural Scene Image using Text Segmentation and Deep Convolutional Sequence" 2018, pp. 1-15. (Year: 2018).*
Avalos et Ortiz, "Geological modeling using Recursive Convolutional Neural Networks" Apr. 27, 2019, arXiv: 1904.12190v1, pp. 1-8. (Year: 2019).*
Alaudah et al., "Structure label prediction using similarity-based retrieval and weakly supervised label mapping" Dec. 13, 2018, pp. V67-V79. (Year: 2018).*
Alaudah et al., "A Machine Learning Benchmark for Facies Classification" Apr. 10, 2019, pp. 1-13. (Year: 2019).*
Tschannen et al., "Facies classification from well logs using an inception convolutional network" Jun. 2, 2017, arXiv: 1706. 00613v1, pp. 1-5. (Year: 2017).*
Li et al., "Multi-Modal Gated Recurrent Units for Image Description" Apr. 20, 2019, arXiv: 1904.09421v1, pp. 1-25. (Year: 2019).*
Jiang et al., "Predicting Video Saliency with Object-to-Motion CNN and Two-layer Convolutional LSTM" Jan. 14, 2019, arXiv: 1709. 06316v3, pp. 1-13. (Year: 2019).*
Liu et al., "Bidirectional-Convolutional LSTM Based Spectral-Spatial Feature Learning for Hyperspectral Image Classification" Mar. 23, 2017, arXiv: 1703.07910v1, pp. 1-18. (Year: 2017).*
Mandya et al., "Combining Long Short-Term Memory and Convolutional Neural Network for Cross-Sentence n-ary Relation Extraction" Nov. 2, 2018, arXiv: 1811.00845v1, pp. 1-9. (Year: 2018).*
Pfeiffer et al., "Semantic Segmentation of Video Sequence with Convolutional LSTM" May 3, 2019, arXiv: 1905.01058v1, pp. 1-7. (Year: 2019).*
Pontes et al., "Predicting the Semantic Textual Similarity with Siamese CNN and LSTM" Oct. 24, 2018, arXiv: 1810.10641v1, pp. 1-9. (Year: 2018).*
Nabavi et al., "Future Semantic Segmentation with Convolutional LSTM" Jul. 20, 2018, arXiv: 1807.07946v1, pp. 1-12. (Year: 2018).*
Office Action for corresponding Saudi Patent application No. 521430790 dated Oct. 29, 2023, with English Translation.
International Search Report and Written Opinion of the International Searching Authority for corresponding International Patent Application No. PCT/IB2019/053811, dated Feb. 7, 2020.
T.J. Jobe, E. Vital-Brazil, M. Khait, "Geological Feature Prediction Using Image-Based Machine Learning", SPWLA Petrophysics Journal, vol. 59, No. 6, pp. 750-760, Dec. 2018.
Vasser R. Busaleh; Abdulazeez Abdulraheem; Taha Okasha, "Prediction of Capillary Pressure for Oil Carbonate Reservoirs by Artificial Intelligence Technique", Paper SPE-182173-MS, presented at the SPE Asia Pacific Oil & Gas Conference and Exhibition, Perth, Australia, Oct. 2016.
Semen Budennyy; Alexey Pachezhertsev; Alexander Bukharev; Artem Erofeev; Dimitry Mitrushkin; Boris Belozerov; Oct. 16-18, 2017, "Image Processing and Machine Learning Approaches for Petrographic Thin Section Analysis", Paper SPE-187885-MS, Society of Petroleum Engineers (SPE), presented at the SPE Russian Petroleum Technology Conference, Moscow, Russia.
Zheng Ma; Shichen Gao; Apr. 17-20, 2017, "Image analysis of rock thin section based on machine learning", presented at the Chinese Geophysical Society / Society of Exploration Geophysicists (CGS/SEG) International Geophysical Conference Qingdao, China, pp. 844-847.
Olaf Ronneberger, Philipp Fischer, and Thomas Brox, 2015, U-Net: Convolutional Networks for Biomedical Image Segmentation, paper arXiv:1505.04597.
VGG 16—Open Source VGG16 Deep Convolution Neural Net, Karen Simonyan, Andrew Zisserman, 2014. Very Deep ConvNets for Large-Scale Image Recognition, ILSVRC Sep. 14, 2014 Workshop and arXi pre-print, arxiv.org/pdf/1409.1556v6/, Visual Geometry Group, University of Oxford, revision 6, Apr. 10, 2015.
Zheng Ma; Shichen Gao; "Image analysis of rock thin section based on machine learning", presented at the Chinese Geophysical Society / Society of Exploration Geophysicists (CGS/SEG) International Geophysical Conference Qingdao, China, pp. 844-847, Apr. 17-20, 2017.

* cited by examiner

300

670 x 504 x 3

Trained Convolution Neural Network
301

Fig. 4A

Carbonate Rock Classification
Texture, Reservoir Rock Quality, Mineralogy
326

300

670 x 504 x 3

Conv. – Rank 3
302
→ ReLu
322a
Activation Function
→ Max. Pool – Rank 3
304

Conv. – Rank 3
306
→ ReLu
322b
Activation Function
→ Max. Pool – Rank 3
308

Conv. – Rank 3
310
→ ReLu
322c
Activation Function
→ Max. Pool – Rank 3
312

Flatten – 1D
314
→ Fully Connected
316
→ ReLu
322d
Activation Function

Dense (Classifier)
318
→ ReLu
322e
Activation Function
→ Class Probabilities
320
→ Softmax
324
Activation Function

Fig. 4B

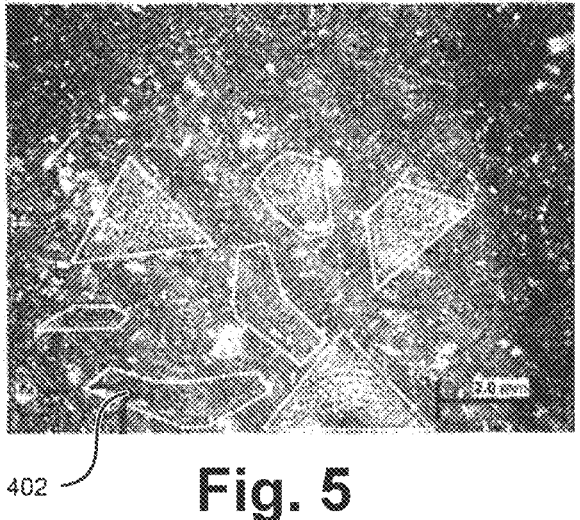

PETROCHEMICAL ANALYSIS SHEET

Well: Xx352
Reservoir Unit: Zone Y01

Pore Type Quantities
Abundant: 3
Common: 2
Rare: 1

Skeletal and Non-skeletal Quantities
Copious: 3
Frequent: 2
Infrequent: 1

| Core Depth (feet) | Reservoir Unit / Zone | | | | | | FRAMEWORK | | | | | | | | | | | | | | | | | | | | | | | Thin Section Machine Description |
|---|---|---|---|---|---|---|---|---|---|---|---|---|---|---|---|---|---|---|---|---|---|---|---|---|---|---|---|---|---|---|---|
| | | TEXTURE PROBABILITIES PERCENT (%) | | | | | | Skeletal Grain Abundance | | | | | | Non-skeletal Grains | | | | PORE TYPES | | | | | | | | Reservoir Quality | Measured Hg Porosity (%) | Measured Helium porosity (%) | Measured Horz. Permeability (md) | Lithofacies | ROCK TYPE | |
| | | Rudstone | Floatstone | Grainstone | Packstone | Mud/Wackstone | Dolomite | Orbitolina sp. | Paleodictyoconus arabicus sp. | Benthonic | Miliolids | Lithocodioidea | Rudist | Peloids | Ooids | Intraclasts | Aggregate Grains | Matrix I | Intragranular | Intergranular | Moldic | Pinpoint | Vugs | Matrix II | Within grains | | | | | | | |
| 10000.6 | Y01A | 2 | 3 | 87 | 65 | 4 | 1 | | 1 | 1 | | | | | 3 | | | | | | 3 | | | | | | H | 16.2 | 16.2 | 147.18 | L1 | 36 | HRQ grainstone with abundant intergranular porosity |
| 10001.7 | | 1 | 1 | 91 | 54 | 2 | 1 | | | | | | | | 2 | | | | | | 1 | | | | | | L | 14.5 | 14.5 | 1.12 | L1 | 16 | |
| 10002.4 | | 1 | 3 | 84 | 49 | 5 | 1 | | | | | | | | | | | | | | | 1 | | | | | L | 11.4 | 11.4 | 0.16 | L5 | 16 | |
| 10003.7 | | 3 | 2 | 23 | 34 | 77 | 2 | | | | | | | | | | | | | | | 1 | | | | | L | 11.7 | 11.7 | 0.90 | L3 | 17 | |
| 10004.3 | | 2 | 2 | 5 | 6 | 83 | 2 | | | | | | | | | | | | 3 | | | | | | | | L | 4.5 | 4.5 | 0.01 | L3 | 17 | |

Fig. 7

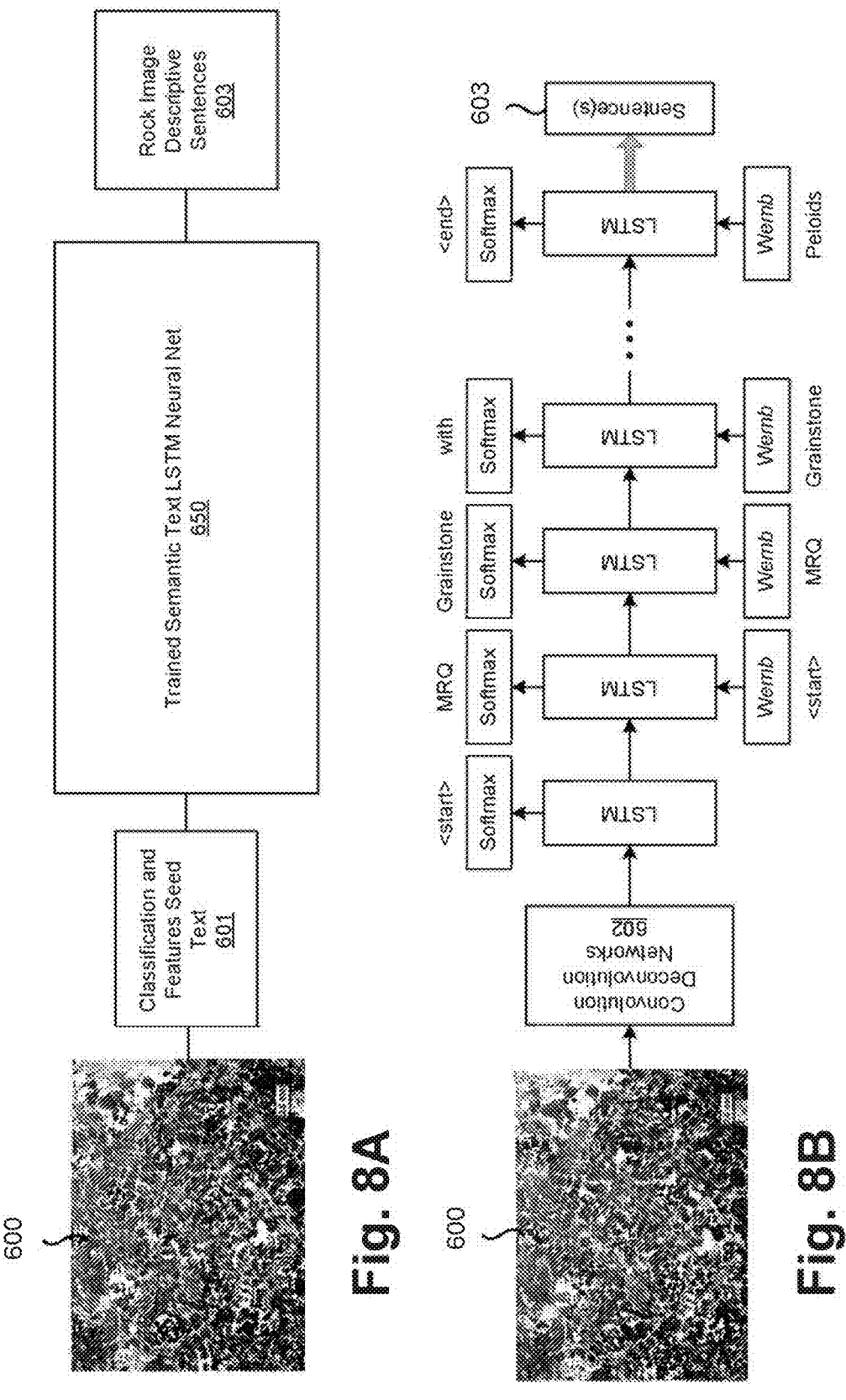

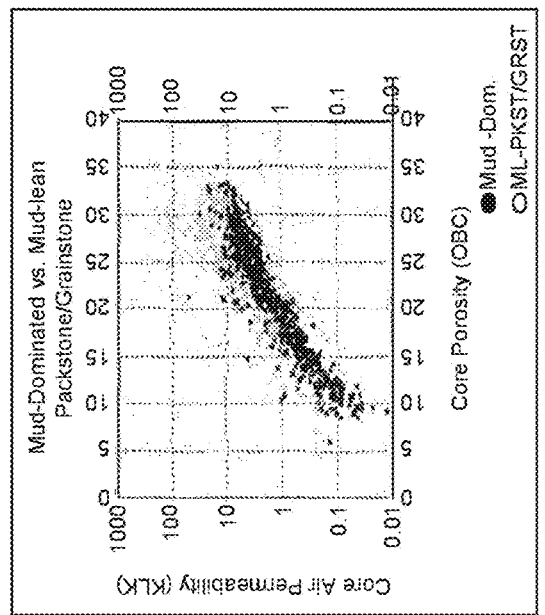
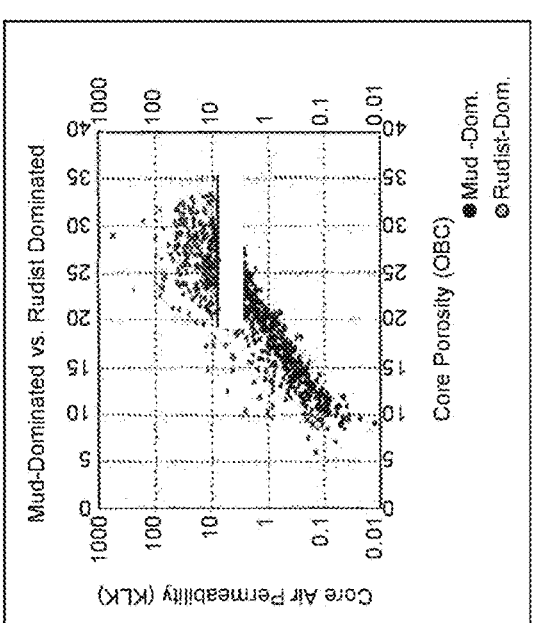
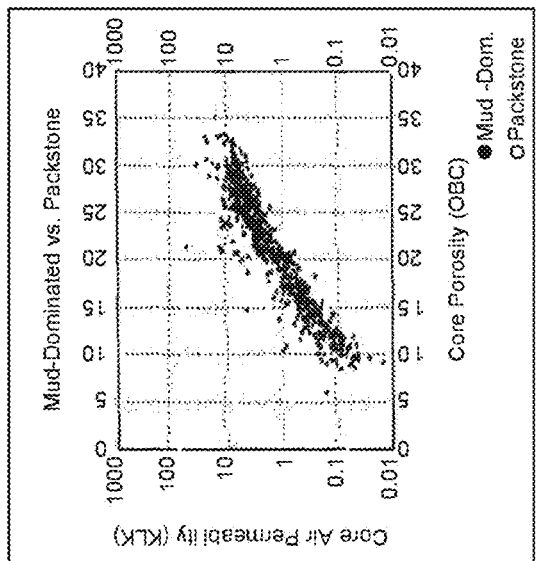
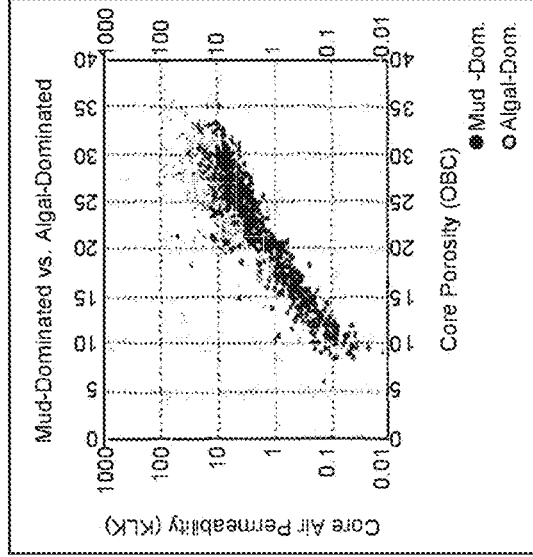
Fig. 14

Training Set TS Images and Metadata ⟋1100

Neural Net Architecture Selection ⟋1102

Neural Net Image Supervised Learning ⟋1104

Validation Set TS Images and Metadata ⟋1106

Model Accuracy Assessment ⟋1108

Blind Test Set TS Images and Metadata ⟋1110

Accuracy Assessment ⟋1112

Trained Inference Model ⟋1114

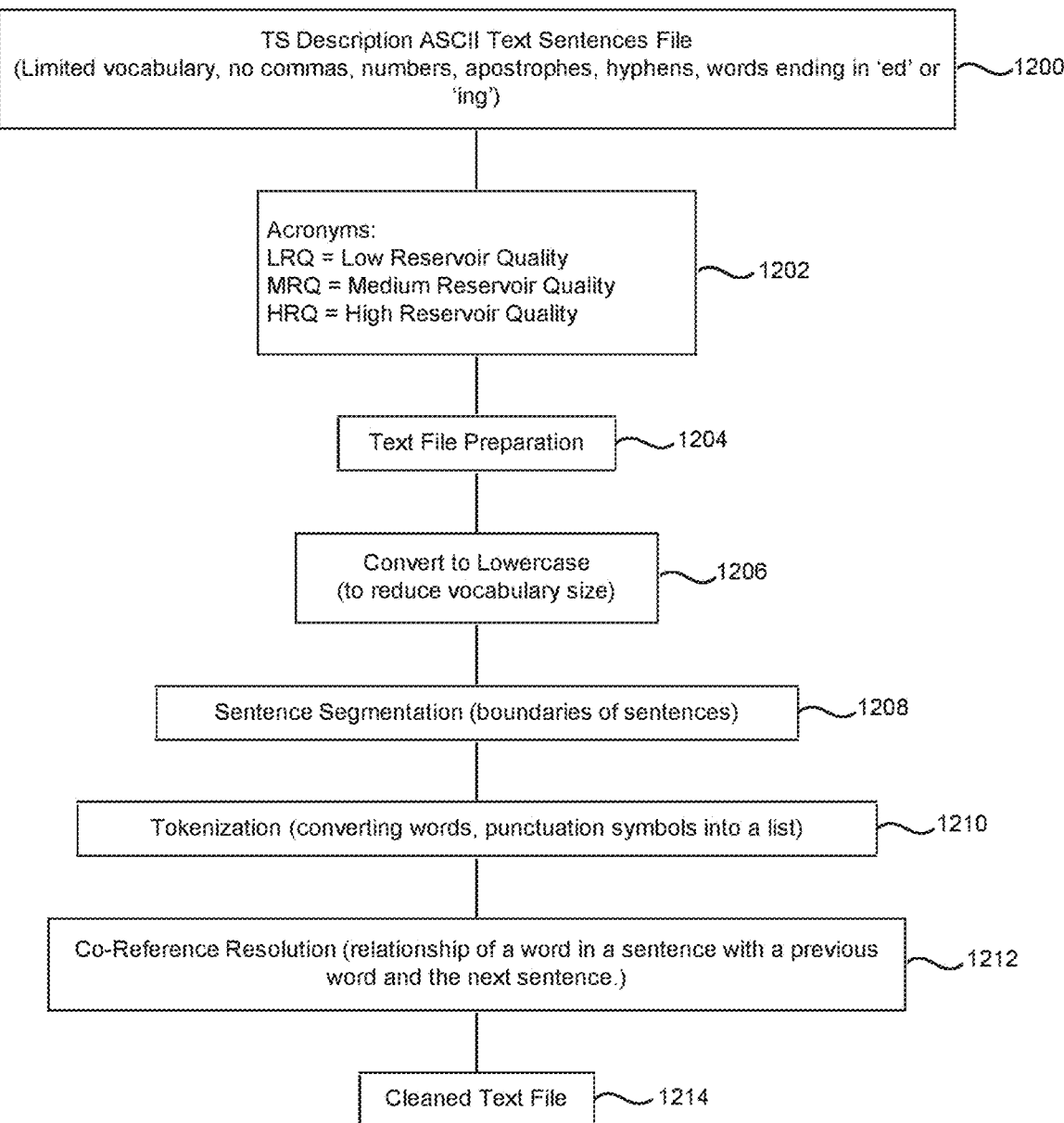

TS Description ASCII Text Sentences File
(Limited vocabulary, no commas, numbers, apostrophes, hyphens, words ending in 'ed' or 'ing') ⌐1200

Acronyms:
LRQ = Low Reservoir Quality
MRQ = Medium Reservoir Quality
HRQ = High Reservoir Quality ⌐1202

Text File Preparation ⌐1204

Convert to Lowercase
(to reduce vocabulary size) ⌐1206

Sentence Segmentation (boundaries of sentences) ⌐1208

Tokenization (converting words, punctuation symbols into a list) ⌐1210

Co-Reference Resolution (relationship of a word in a sentence with a previous word and the next sentence.) ⌐1212

Cleaned Text File ⌐1214

Fig. 18

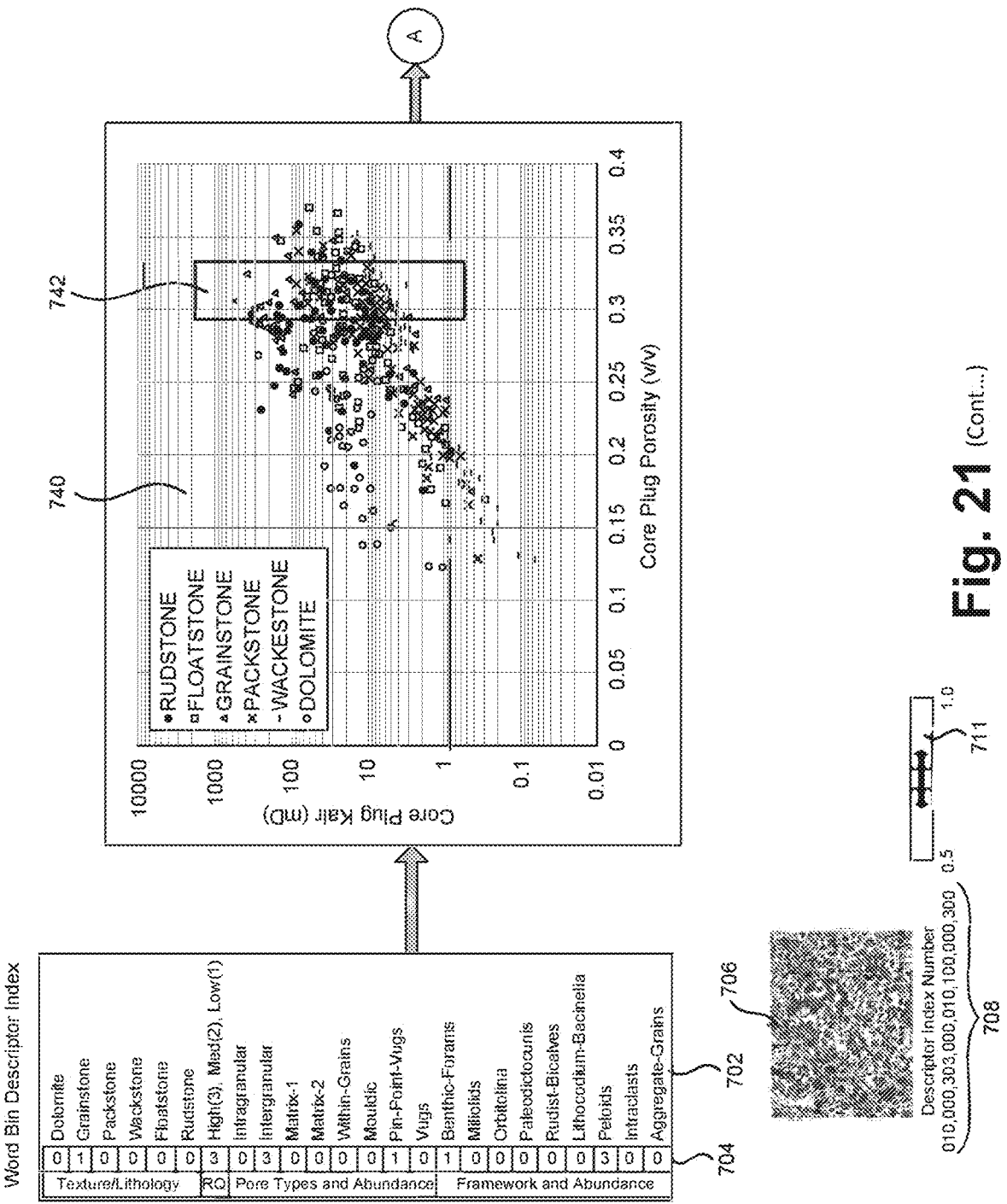
Fig. 21 (Cont...)

AUTOMATED METHOD AND SYSTEM FOR CATEGORISING AND DESCRIBING THIN SECTIONS OF ROCK SAMPLES OBTAINED FROM CARBONATE ROCKS

This application is a national phase of International Patent Application No. PCT/IB2019/053811, filed May 9, 2019, and published in the English language, the entire disclosure of which is hereby incorporated by reference.

The present disclosure relates to a method and system for categorising and describing thin sections of rock samples obtained from carbonate rocks.

Carbonate reservoirs contain around half of the world's oil reserves. The amount of oil recovered from carbonates reservoirs containing heavy to light oil averages about 36%. Carbonate reservoirs generally have poor hydrocarbon recovery performance. This is commonly attributed to reservoir macro and micro heterogeneity resulting in complex fluid flow regimes affecting reservoir sweep and microscopic displacement efficiency. For example, sweep efficiency depends on factors such as reservoir structure, faults/fractures, oil viscosity, field management, displacement mechanism, presence or absence of high permeability layers etc. Microscopic displacement efficiency for example depends on factors such as the reservoir rock's pore system architecture, fluid-rock wettability and fluid mobility. Carbonate rocks pore systems have varying complexity, which is generally determined by their depositional (high energy vs low energy) environment and post deposition diagenetic modification. Diagenesis (such as leaching, and cementing) may modify the rock pore system either aiding or hindering oil recovery and production.

In general, commercial oil producers seek to maximise oil recovery efficiency using the least number of wells and minimum monetary expenditure. To help towards this goal, reservoir engineers may construct digital simulation models to test reservoir behaviour under different field development scenarios for example by considering well spacing, type of well, number of wells and pressure maintenance schemes.

Reservoir simulation is generally based on an underlying geological model built upon detailed geologic descriptions linked to reservoir rock's static and dynamic physical properties such as: porosity; permeability; capillary pressure; and relative permeability. These properties affect factors such as hydrocarbon storage, the ability of fluids to flow, fluid saturation distribution and remaining oil saturation.

To help generate a model for the simulation, Petrographers may visually examine microscopic sedimentary features such as fine bedding, lithology, texture, fabric, grain or crystal size, fossil material, pore types and sizes. Microscopic geological features combined with macroscopic core descriptions and stratigraphy may provide information about the rocks depositional setting and diagenetic history. Knowledge of each rocks depositional settings and diagenetic history may allow the construction of conceptual geological models and distribution of varying physical properties in 3D space using geostatistical methods.

For example, rocks of similar geologic history and physical properties (such as porosity, permeability, drainage capillary pressure, pore throat size distribution, and lithology) may be grouped together to form Rock Type classes as is known in the art. Based on the conceptual and statistical distribution of these Rock Types in 3D Geomodel space, Reservoir Engineers may test predictions of dynamic reservoir behaviour against actual reservoir performance using a reservoir simulation. For example, several conceptual and statistical geological models may be considered and the best match to actual field flow performance selected. If the amount of information is inadequate, Geologists and Petrophysicists may seek to relate well log responses to the Rock Types to fill in information gaps.

For example, in order to help analyse rock samples, a manual process may be carried out by a Petrographer. Typically, in this process, cylindrical 2.54 to 3.81 cm diameter core plugs of 7.62 to 13.34 cm length are extracted from carbonate reservoirs and measured for (routinely but not always) porosity/permeability and grain density. The core plug may be machined into two dimensional (2D) rock image thin sections (TS) that are typically orientated perpendicular to sedimentary bedding planes. In general, a thin section is a rock slice that is thin enough (typically around 30 μm) to allow visible light to pass through.

Generally, a combination of Alizarim Red-S and Potassium Ferricyanide may be used to stain half of the thin section, while the other half retains the rock's natural colour. Alizarim Red-S helps identify the presence of calcite (pink orange stain) and dolomite (no stain). Potassium Ferricyanide helps identify the degree of Ferron in the calcite or dolomite. Blue epoxy may be injected at high pressure to fill the rock pore fluid storage volume. A subset of plugs may be used for Special Core Analysis (SCAL) to identify capillary pressure, relative permeability and saturation oil remaining (SOR). Porosity permeability, and grain density measurements associated with the thin section are frequently but not always available.

A Petrographer may examine a rock thin section through a microscope to visually estimate the percentage of dolomite present based on the area left unstained by the Alizarim Red-S. Grain density (for example, calcite 2.71 g/cc, dolomite 2.83 to 2.87 g/cc) of the thin section source core plugs may provide additional evidence of dolomite or other minerals presence. The rock texture may be identified (classified) by the petrographer using a plurality of classification systems such as the Folk, Dunham, and Modified Dunham classification systems, which are widely used carbonate classification systems.

The Petrographer may also qualitatively assess (e.g. High, Medium, Low) the reservoir rock quality (RQ). Generally, reservoir rock quality is the ability to store and flow hydrocarbons (e.g. through rock porosity and rock permeability respectively). Other attributes may also be assessed by the Petrographer, such as classification of pore types. For example, the abundance and complexity of pore types plays a role in estimating the potential oil recovery; oil residing in uniform pore systems is generally more likely to be produced by conventional methods than oil in complex pore systems of varying size and connectivity.

The Petrographer may also assess the rock framework, e.g. for the presence of skeletal and/or non-skeletal grains since a carbonate rock's depositional environment (unless significantly altered by diagenesis) influences reservoir rock quality. Additionally, other assessments may be carried out such as assessment of static and dynamic properties based on texture class, pore types and previously laboratory measured porosity/permeability and the Petrographer's visual assessment of rock quality. For example, porosity-permeability relations, capillary pressure and water displacing oil relative permeability for High, Medium and Low Reservoir Quality (HRQ, MRQ, LRQ) Rock Type Classes may be measured and assessed.

A reservoir simulation may be used to inform and guide a company's management in their field development decisions. However, the predictive accuracy of a reservoir simulation generally relies heavily on the representation provided by the geological model. To help generate the model, geologists often rely on laborious, time consuming, reservoir rock thin section visual descriptions to identify depositional and diagenetic geological processes controlling reservoir rock quality, flow units and ultimate oil recovery, for example as mentioned above. This has not changed significantly since these techniques were introduced.

Geologist's understanding of sedimentary and diagenetic processes may help guide the distribution of rocks of differing petrophysical properties in a 3D Geomodel space. However, even with the use of large rock image databases, portions of data within the database may remain unused or unanalysed due to time constraints and resource limitations. Also, the qualifications and experience of the Petrographer may dictate the accuracy and quality of the rock description. For example, rock descriptions may often be inconsistent between Petrographers of varying experience and knowledge.

There are thus several issues with the current workflow process used to help build simulation models from rock thin section image descriptions where the image descriptions are compiled by a human petrographer such as:

Generating image description is typically time intensive—a typical output for one Petrographer is about 25-50 image descriptions per day;

Accuracy and quality of image description results depends on the Petrographer's level of experience and exposure to the particular geological environment;

Descriptions/interpretations may be inconsistent between different Petrographers;

There is a limited number of expert Petrographers available;

Geomodels may be built using part of the available rock data rather than all the data due to schedule time constraints and available human resources;

Geological models may require long periods to build and are typically slow to be updated; and Non-representative geology leads to inaccurate simulation model predictions.

There have been some proposals to automate some aspects of the analysis in the context of petrophysical analysis, such as T. J. Jobe; E. Vital-Brazil; M. Khait; December 2018. "Geological Feature Prediction Using Image-Based Machine Learning", SPWLA Petrophysics Journal, Vol. 59, No. 6, pp. 750-760, who used a convolution neural net (Inception-v3) to identify limestone Dunham classification textures and MATLAB® to calculate pore size and shape statistics. CN107633255, August 2017, which relates to a method for automatically identifying and classifying metamorphic and igneous rock lithology using a supervised learned convolution neural net (Inception-v3). U.S Patent Application No. 2012/0275658A1 which relates to petrographic porous media image analysis for determining pore size to pore throat ratios and calculating capillary pressure. Yasser R. Busaleh; Abdulazeez Abdulraheem; Taha Okasha; October 2016, "Prediction of Capillary Pressure for Oil Carbonate Reservoirs by Artificial Intelligence Technique", Paper SPE-182173-MS, presented at the SPE Asia Pacific Oil & Gas Conference and Exhibition, Perth, Australia, used core plug measured porosity, permeability, grain density and mercury injection (Hg) as inputs to train Artificial Neural Nets (ANN), Decision Tress, Fuzzy Logic and Support Vector Machine to predict mercury injection capillary pressure curves. Other background documents are Semen Budennyy; Alexey Pachezhertsev; Alexander Bukharev; Artem Erofeev; Dimitry Mitrushkin; Boris Belozerov; 16-18 Oct. 2017, "Image Processing and Machine Learning Approaches for Petrographic Thin Section Analysis", Paper SPE-187885-MS, Society of Petroleum Engineers (SPE), presented at the SPE Russian Petroleum Technology Conference, Moscow, Russia, who used a trained decision tree to classify rock into limestone, dolomite, sandstone, and a trained random forest neural net to classify mineral composition of sandstones and image segmentation combined with K-means clustering to identify rock grain properties, and Zheng Ma; Shichen Gao; 17-20 Apr. 2017, "Image analysis of rock thin section based on machine learning", presented at the Chinese Geophysical Society/Society of Exploration Geophysicists (CGS/SEG) International Geophysical Conference Qingdao, China, pages 844-847. However, these do not address the complete carbonate rock reservoir description workflow from description to assignment of petrophysical properties.

Examples of the present disclosure seek to address or at least alleviate the above issues. Examples of the disclosure may be aimed at helping to improve rock description efficiency and accuracy, as well as accelerating Geomodel development.

In a first aspect, there is provided an automated method for categorising and describing thin sections of reservoir rock samples obtained from carbonate rocks, the method comprising: capturing, using an input image data module, images of one or more thin sections of one or more input rock samples obtained from reservoir carbonate rocks so as to generate input rock image data; classifying, using a classifying module based on a trained convolutional neural network generated from supervised learning, the one or more input rock samples by applying convolutional neural network processing to the input rock image data to identify one or more attributes of the input rock samples; extracting, using a trained salient feature extraction module based on a trained convolution deconvolution neural network, salient features from the one or more attributes of the input rock samples so as to generate salient feature data; applying, using a semantic text processing module based on a trained recurrent neural network generated from supervised learning, semantic text processing to the salient feature data so as to generate input rock sample text data indicative of the one or more attributes of the input rock samples; storing, using a storage module, the input rock sample text data; searching, using a search module, a rock image database for categorised images that are similar to the captured images based on the stored rock sample text data and database text data associated with the categorised images stored in the rock image database, in which the rock image database comprises categorised images of categorised rock samples and the database text data, and the database text data is indicative of one or more attributes of the categorised rock samples and is associated with petrophysical measurements of the categorised rock samples; and generating output data dependent upon a degree of similarity between the rock sample text data and the database text data so that the output data indicates petrophysical properties of the carbonate rocks associated with the thin sections of input rock samples that are identified as being within a selected degree of similarity to the categorised rock samples in the rock image database based on a comparison of the stored rock sample text data with the database text data, and in which the output data is based on the petrophysical measurements of the categorised rock samples identified as being within a selected degree of similarity to the input rock samples.

In a second aspect, there is provided an automated system for categorising and describing thin sections of reservoir rock samples obtained from carbonate rocks, the system comprising: an image data input module operable to capture images of one or more thin sections of one or more input rock samples obtained from reservoir carbonate rocks so as to generate input rock image data; a classifying module operable to classify, based on a trained convolution neural network generated from supervised learning, the one or more rock samples by applying convolutional neural network processing to the input rock image data to identify one or more attributes of the rock samples; a salient feature extraction module operable to extract, based on a trained convolution deconvolution neural network, salient features from the one or more attributes of the rock samples so as to generate salient feature data; a semantic text processing module operable to apply semantic text processing, based on a trained recurrent neural network generated from supervised learning, to the salient feature data so as to generate input rock sample text data indicative of the one or more attributes of the rock samples; a storage module operable to store the input rock sample text data; a search module operable to search a rock image database for categorised images that are similar to the captured images based on the stored rock sample text data and database text data associated with the categorised images stored in the rock image database, in which the rock image database comprises categorised images of categorised rock samples and the database text data, and the database text data is indicative of one or more attributes of the categorised rock samples and is associated with petrophysical measurements of the categorised rock samples; and an output module operable to generate output data dependent upon a degree of similarity between the rock sample text data and the database text data so that the output data indicates petrophysical properties of the carbonate rocks associated with the thin sections of input rock samples that are identified as being within a selected degree of similarity to the categorised rock samples in the rock image database based on a comparison of the stored rock sample text data with the database text data, and in which the output data is based on the petrophysical measurements of the categorised rock samples identified as being within a selected degree of similarity to the input rock samples.

For example, the trained recurrent neural network may be a Long Short Term Memory (LSTM). Other aspects and features are defined in the appended claims.

Examples of the disclosure may thus help provide faster, more consistent visual interpretations of carbonate reservoir rock and may, for example, be applied to 2D thin sections of carbonate reservoir rock obtained from oil and gas fields of the Middle East.

For example, by conducting a search of an image database based on rock sample text data generated from salient feature data, examples of the disclosure may help provide more consistent results, while the output may be more compatible with current workflows, thus improving efficiency. Furthermore, for example, large data volumes may help improve the accuracy of the modelling. Examples of the disclosure may also help retain expert knowledge, and provide a training platform for less experienced staff. Additionally, for example, more of the data contributions to geological representativeness of reservoir models may be used to predict reservoir flow performance. Further, links or associations between images of thin sections and measured rock petrophysical properties may also be improved. The examples described herein may help improve rock description efficiency and accuracy, as well as helping accelerate Geomodel development.

Examples of the disclosure will now be described by way of example only with reference to the accompanying drawings, in which like references refer to like parts, and in which:

FIG. 4A is a schematic diagram of a general implementation of a convolutional neural network, and FIG. 4B is a schematic diagram of a more specific implementation of a convolutional neural network;

FIG. 5 is an image showing polygon chain labelling of foraminifera in a thin section image of a rock sample;

FIG. 7 is schematically shows an example of spreadsheet analysis of salient features;

FIG. 8A is a schematic diagram of a general semantic text processing arrangement, and FIG. 8B is a schematic diagram of a more specific semantic text processing arrangement;

Figure 9:
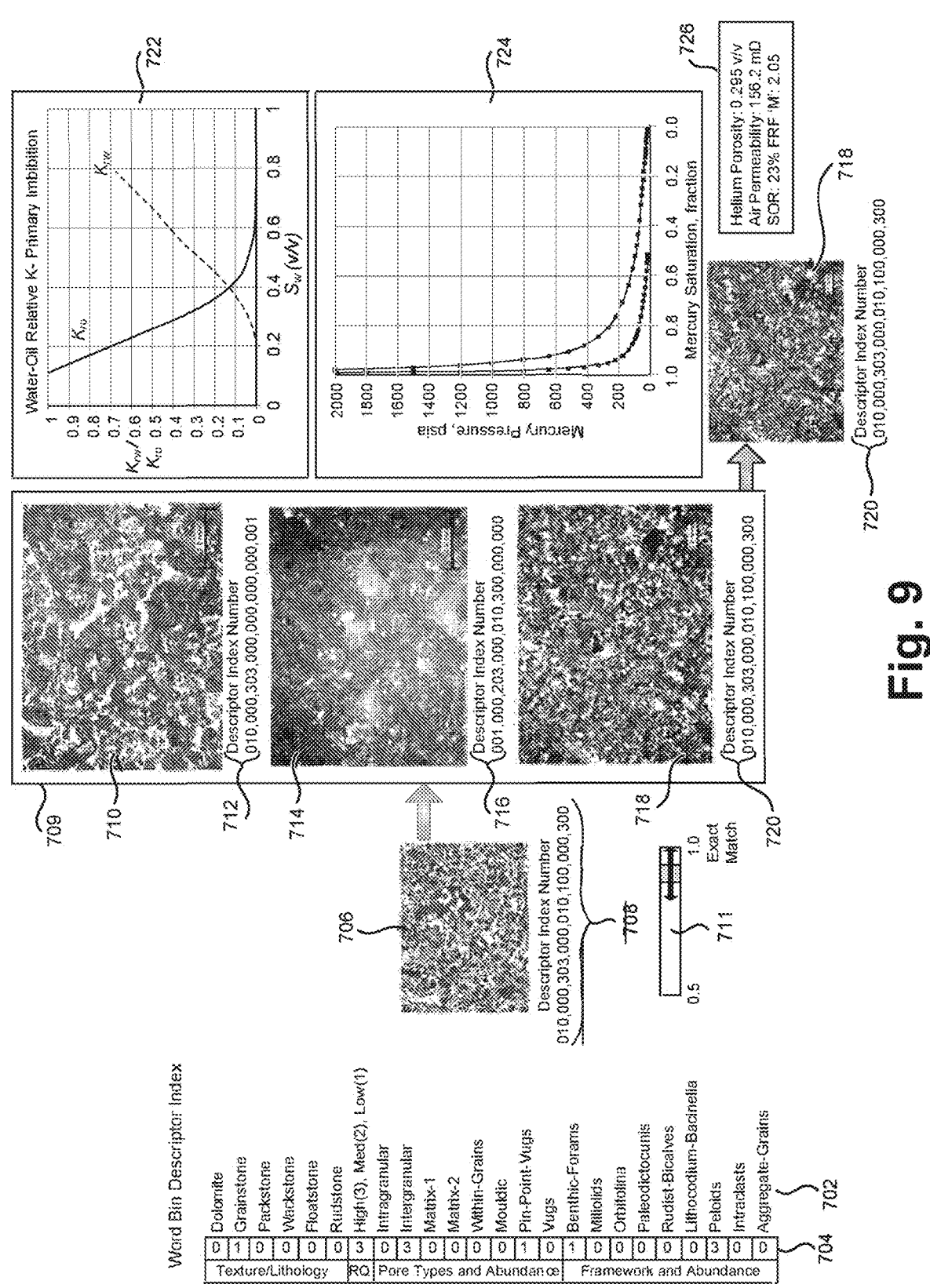
Figures 10, 11A, 11B, 11C:
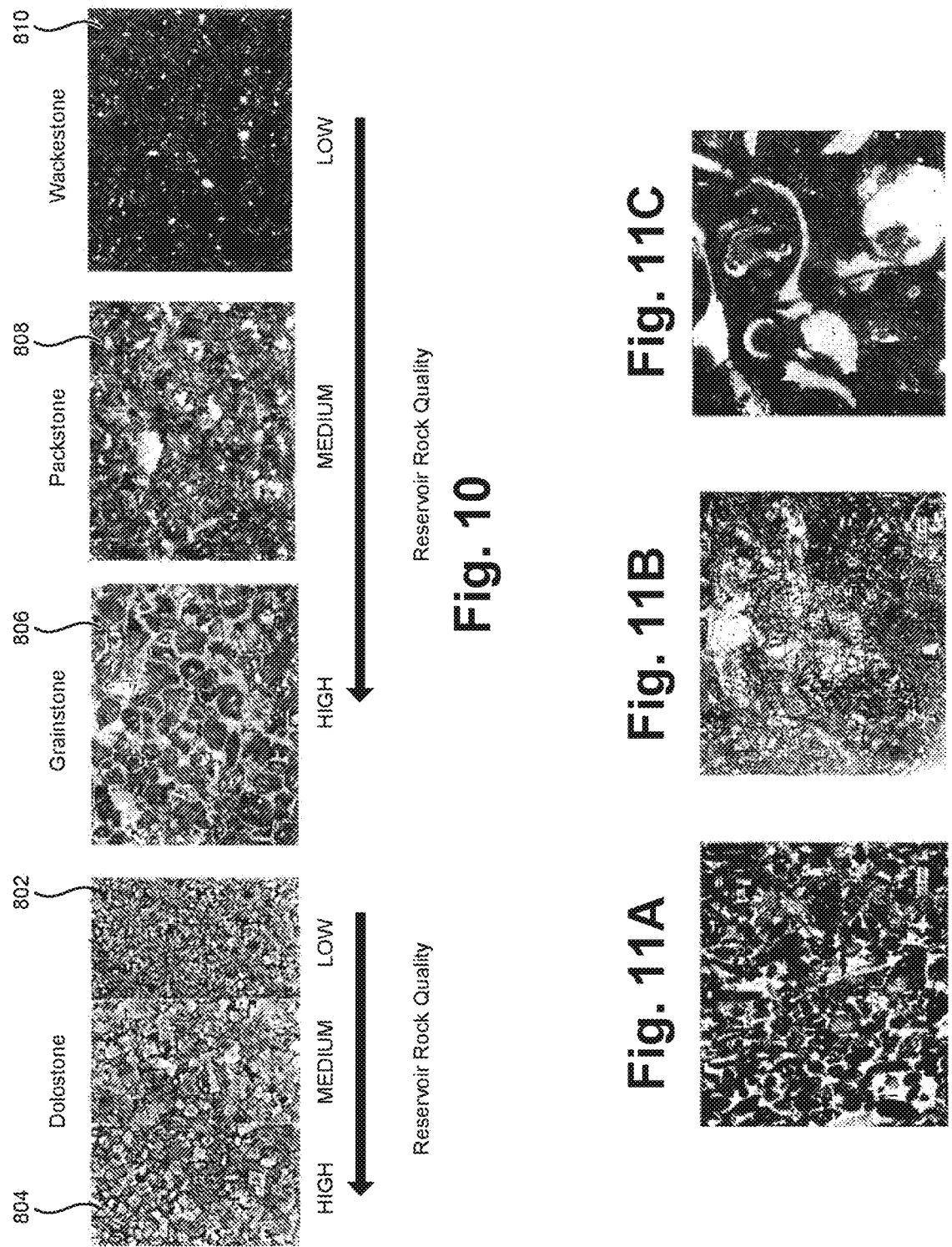
Figure 12:
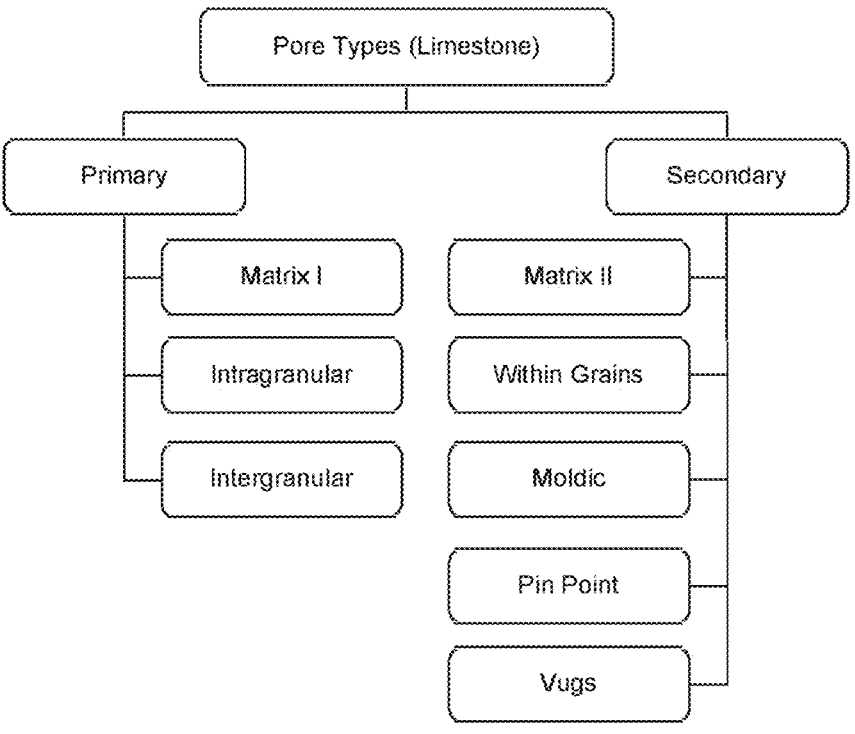
Figures 13A, 13B:
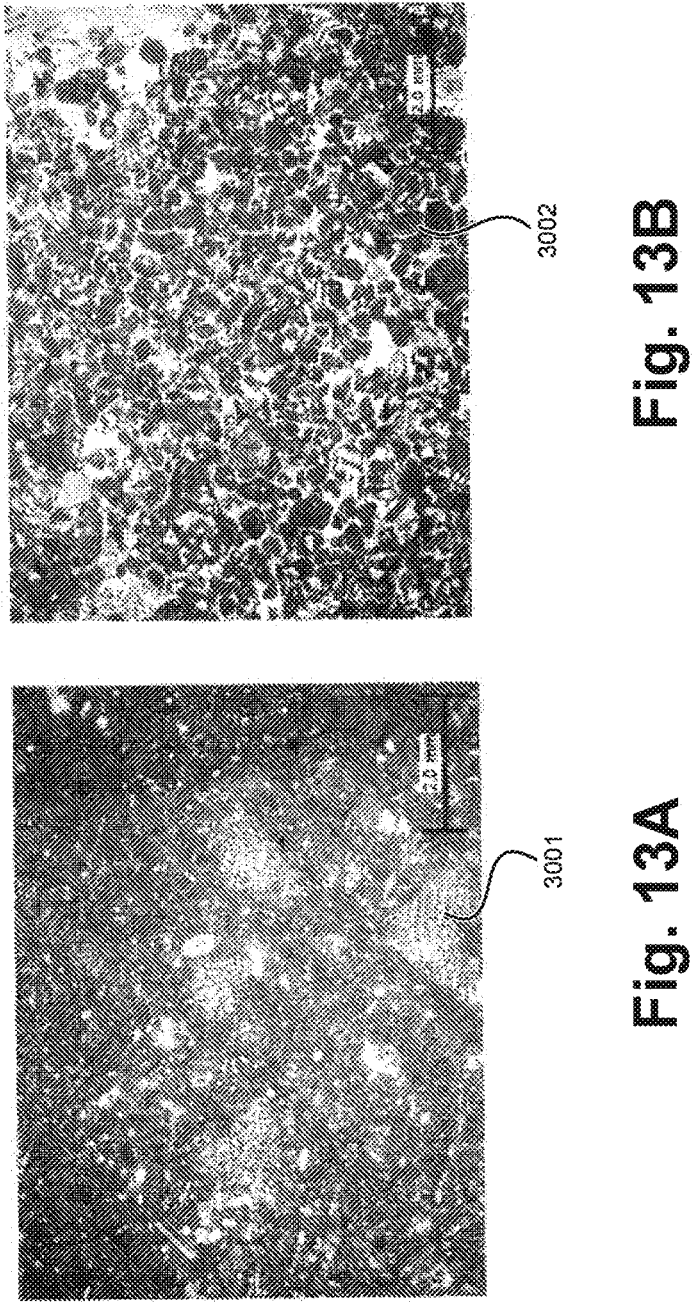
Figures 15A, 15B, 15C:
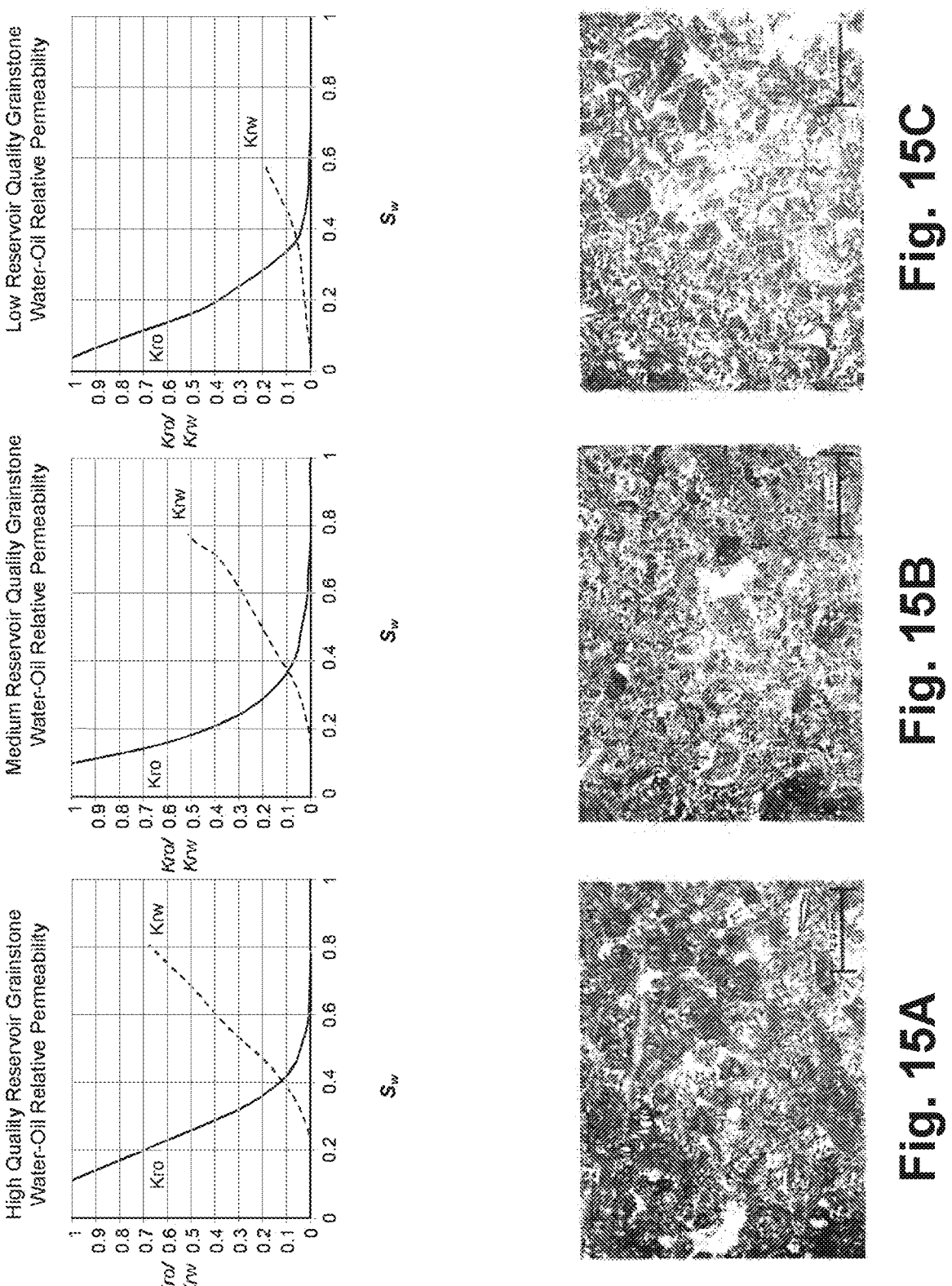
Figure 16:
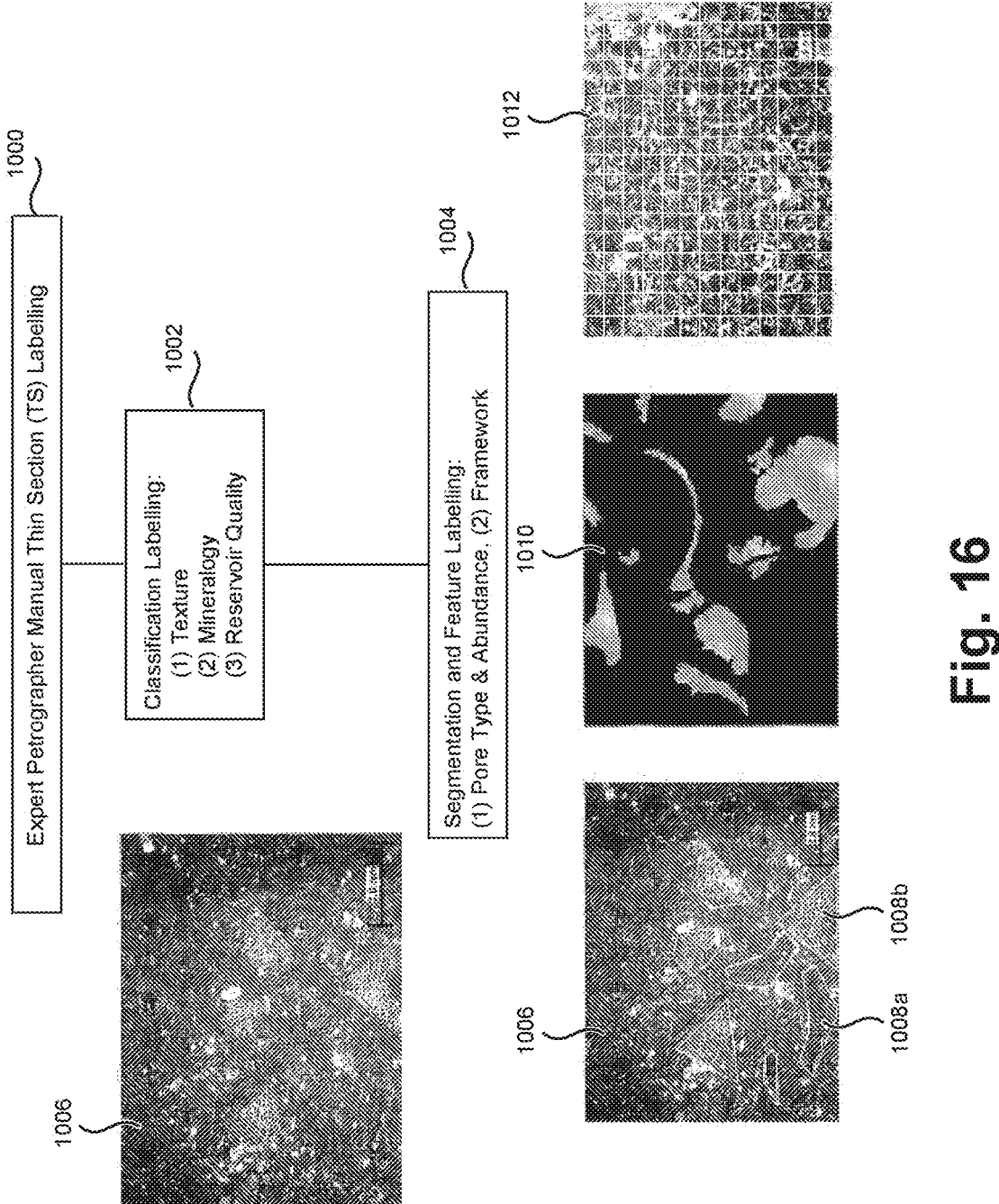
Figure 17:
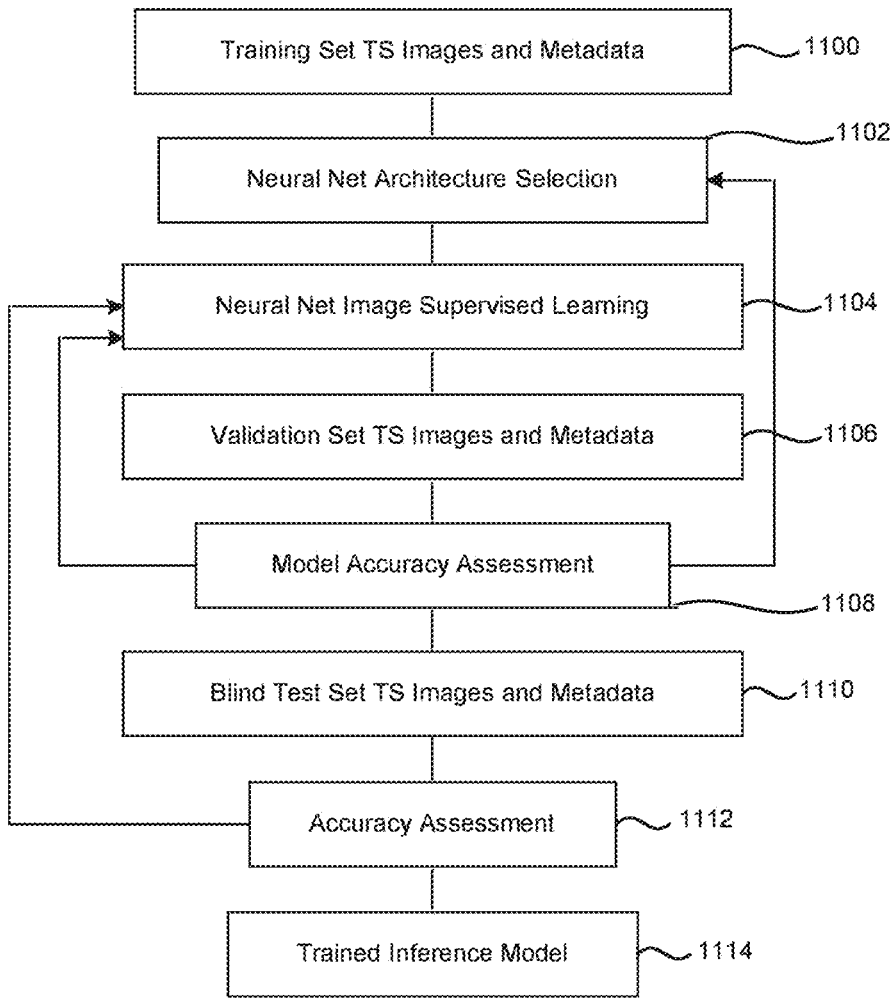
Figure 19:
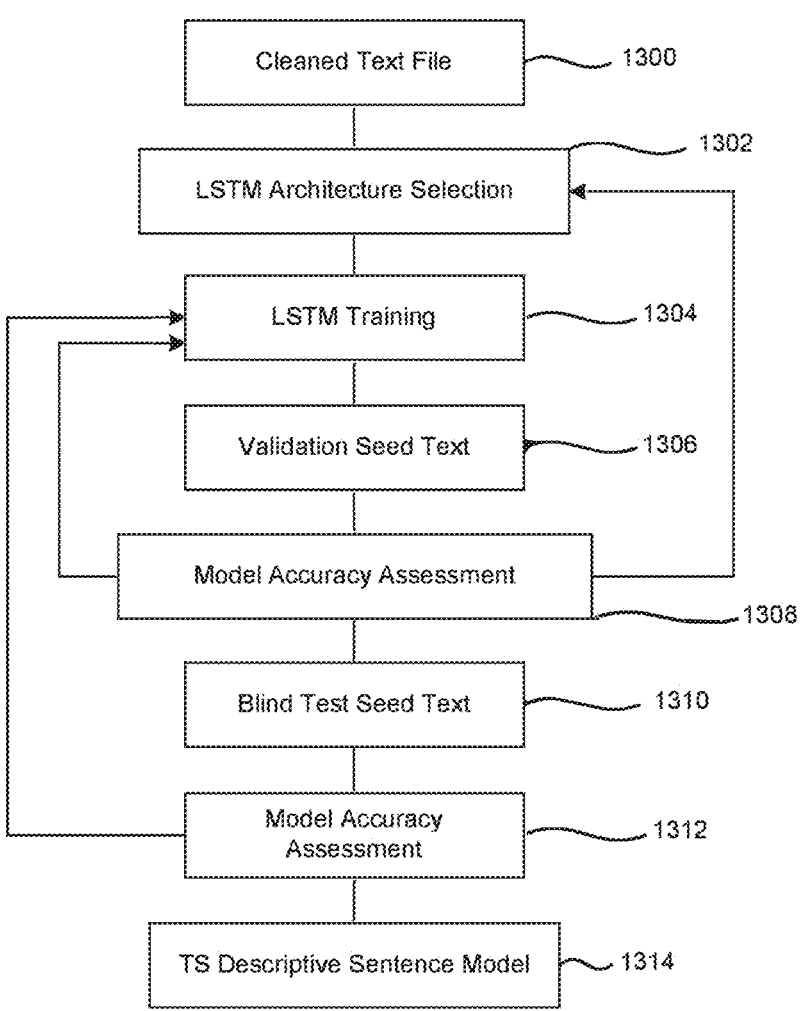
Figure 20:
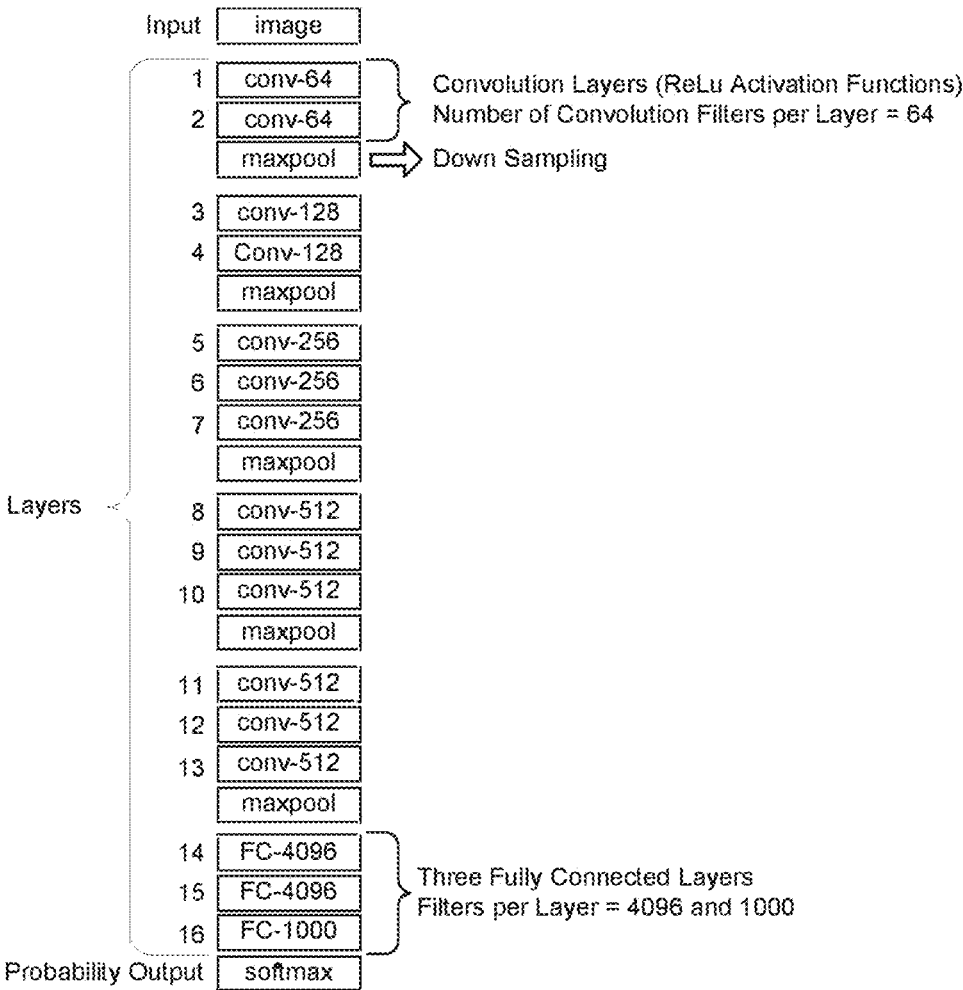
Figure 21:
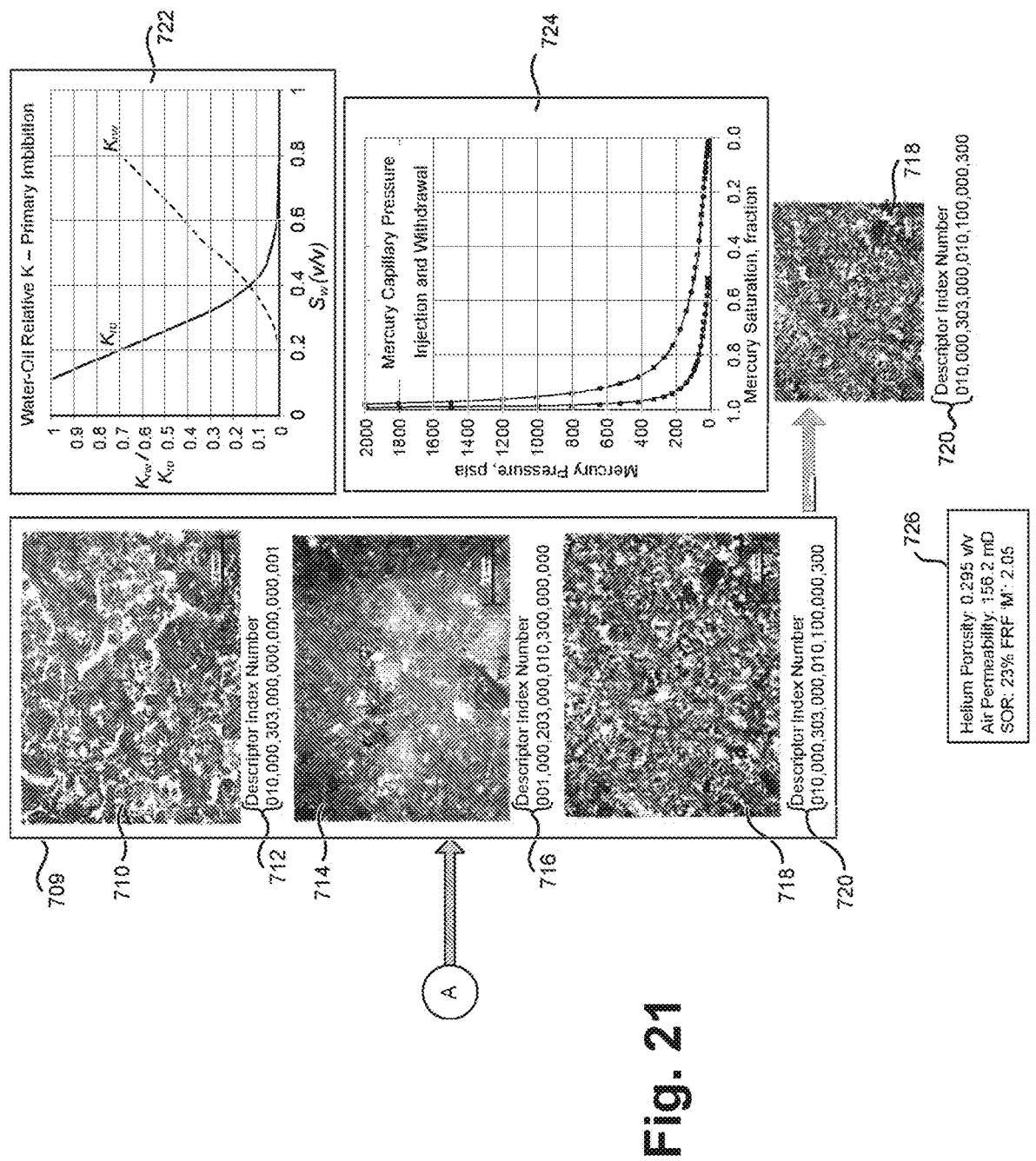
Figure 22:
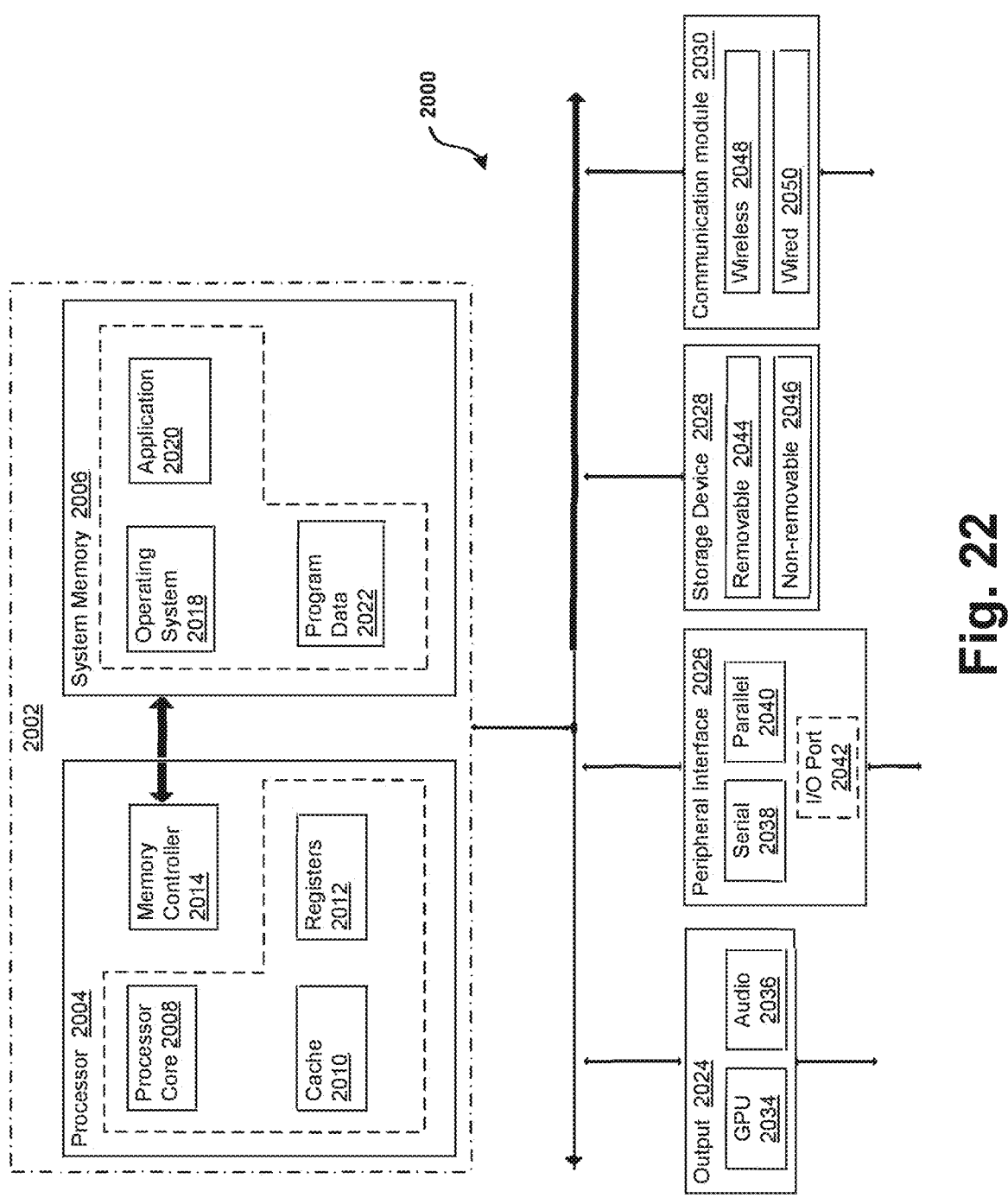

FIG. 9 schematically shows images related to word bins of an image search;

FIG. 10 shows example images of different grades of reservoir rock quality;

FIGS. 11A to 11C show example images of common pore types in limestone reservoir rocks;

FIG. 12 shows an example of different classifications of pore types in limestone;

FIG. 13A shows an example image of a thin section rock sample with skeletal grains, and FIG. 13B shows an example image of a thin section rock sample with non-skeletal grains;

FIG. 14 shows example plots of porosity-permeability relation for limestone;

FIGS. 15A to 15C shows example images and associated permeability plots for different quality grainstones;

FIG. 16 is a schematic representation of generation of a labelled image training database;

FIG. 17 shows a process flowchart implementing image recognition supervised learning;

FIG. 18 shows a process flowchart implementing thin section text file pre-processing;

FIG. 19 shows a process flowchart implementing thin section semantic text Long Short Term Memory (LSTM) supervised learning;

FIG. 20 shows an example of parameters used of an example convolution neural net architecture;

FIG. 21 schematically shows images related to word bins of an image search together with a petrophysical property selection graph; and FIG. 22 schematically shows an automated system for implementing methods of examples of the disclosure.

A method and system for categorising thin sections of rock samples obtained from carbonate rocks is disclosed. In the following description, a number of specific details are presented in order to provide a thorough understanding of the examples of the disclosure. It will be apparent however to a person skilled in the art that these specific details need not be employed in order to practise the examples of the disclosure. Conversely, specific details known to the person skilled in the art are omitted for the purposes of clarity in presenting the examples.

Figure 1:
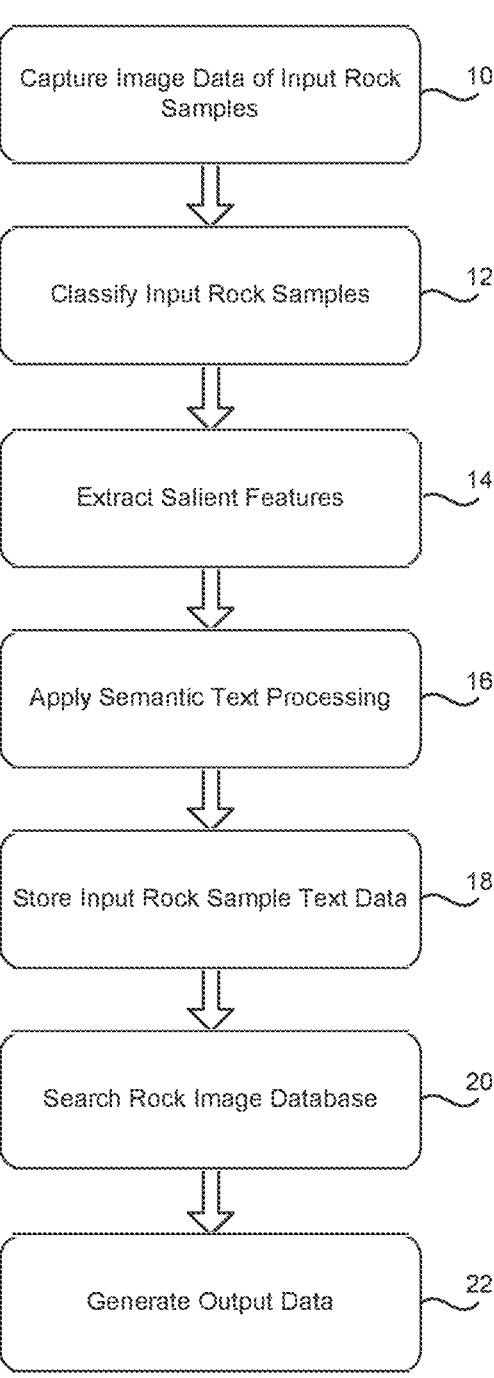
FIG. 1 is a flow chart of a method for categorising thin sections of rock samples obtained from carbonate rocks according to examples of the disclosure.
Figure 2:
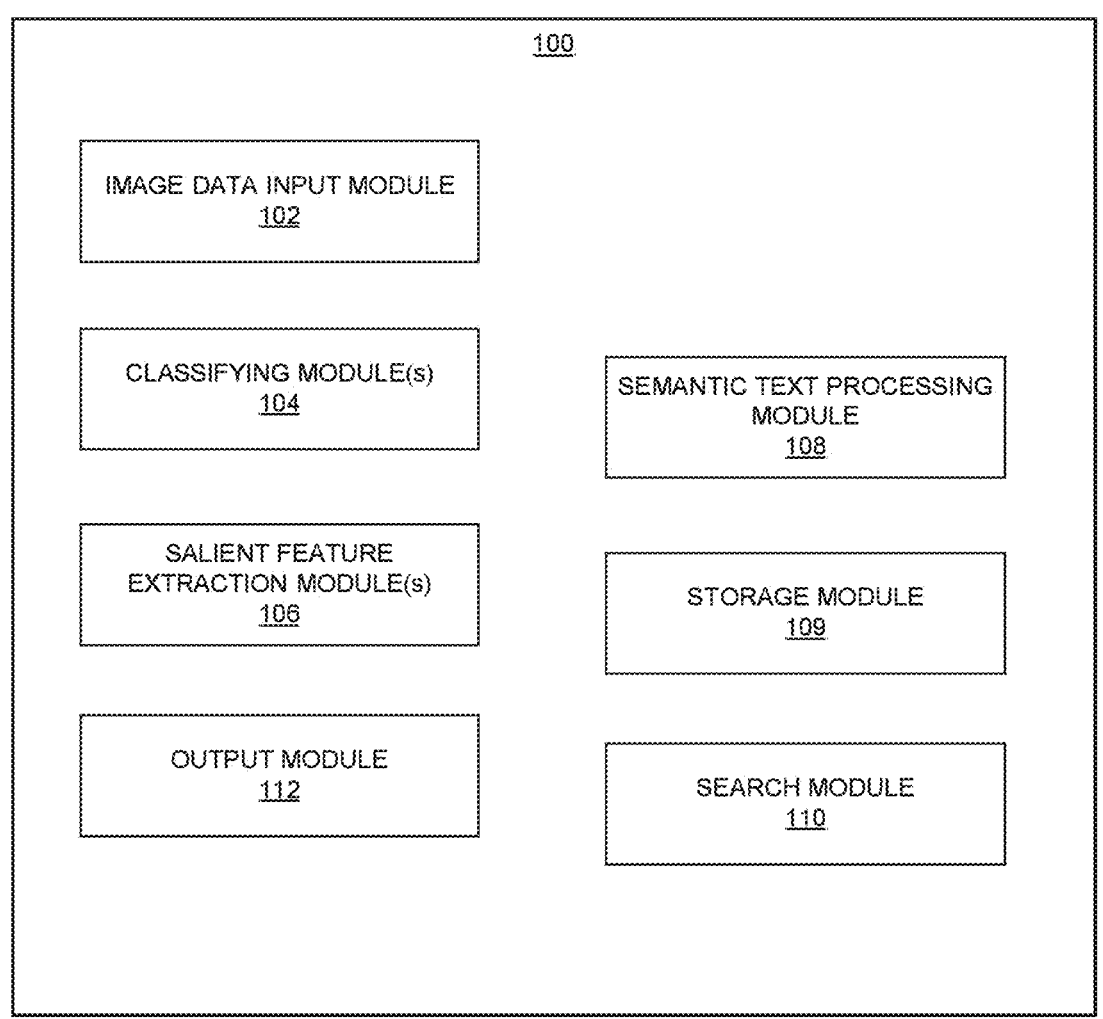
FIG. 2 is a schematic diagram of a system for categorising thin sections of rock samples obtained from carbonate rocks.

Examples of a method and system for categorising thin sections of rock samples obtained from carbonate rocks according to examples of the disclosure will now be described with reference to FIGS. 1 and 2. FIG. 1 is a flow chart of an automated method for categorising thin sections of rock samples obtained from carbonate rocks according to examples of the disclosure. FIG. 2 is a schematic diagram of an automated system for categorising thin sections of rock samples obtained from carbonate rocks according to examples of the disclosure.

In particular, FIG. 2 schematically illustrates a system 100 comprising an image data input module 102, a classifying module 104, a salient feature extraction module 106, a semantic text processing module 108, a storage module 109, a search module 110, and an output module 112. The operation of the modules of the system 100 according to examples of the disclosure will be described in more detail below in conjunction with FIG. 1.

In a step s10, images of one or more thin sections of one or more input rock samples obtained from reservoir carbonate rocks are captured so as to generate input rock image data. In examples, the images are captured by digital image capture of thin sections from one or more carbonate rock samples, for example, by using a suitable microscope and imaging device such as a charge coupled device (CCD), to capture one or more images of the thin section rock sample. In examples, the input rock image data may be generated from the captured images using suitable image processing and/or data compression techniques. Additionally, multiple adjacent concurrent images captured from a thin section may be stitched together to form a larger field of view than delivered by the user selected microscope magnification.

In examples, the input rock image data may be stored in a suitable thin section image database, for example relating to a plurality of images which relate to a plurality of thin sections. In examples, the input rock image data may be provided substantially in real time as it is captured by the imaging device, although in other examples, the image data may be provided from the thin section image database, for example in relation to thin sections of rock samples associated with a particular geographical area of interest. In examples, the input rock image data may be stored in the storage module 109.

In examples, the image data input module 102 may be operable to implement the functionality of the step s10. In examples, the image data input module 102 comprises an image capturing device such as a charge coupled device arranged with respect to a microscope on which a thin section rock sample may be placed so that the image capturing device may capture one or more images of the thin section rock sample. In examples, the image data input module 102 may comprise an Automated Thin Section Scanner and/or Microscope. In examples, capture of the images of the thin section rock samples may be automated. In examples, the image data input module 102 comprises a thin section rock sample database comprising image data relating to a plurality of thin section rock samples. In examples, the image data input module 102 is operable to provide the input rock image data to the classifying module 104. In other words, more generally, the image data input module 102 is operable to provide image data relating to captured images of one or more thin sections of one or more rock samples obtained from carbonate rocks. In examples, image data stored in the thin section rock sample database may be used for training of one or more neural network arrangements, as will be described in more detail later below.

At a step s12, the one or more rock samples are classified, using the classifying module 104, by applying convolutional neural network (CNN) processing to the input rock image data to identify one or more attributes of the input rock samples. For example, the image data may be classified according to one or more of mineralogy (such as dolomite vs calcite based on presence or absence of dolomite crystals), texture, and rock quality. Application of convolutional neural network processing will be described in more detail later below.

In examples, the classifying module 104 is operable to receive the input rock image data from the image data input module 102. More generally, in examples, the classifying module 104 is operable to classify the one or more rock samples by applying convolutional neural network processing to the image data to identify one or more attributes of the rock samples, for example so as to implement the step s12. In examples, the classifying module 104 is based on a trained convolutional neural network generated from supervised learning as will be described in more detail later below.

At a step s14, salient features are extracted from the one or more attributes of the rock samples, using the salient feature extraction module 106, so as to generate salient feature data. In examples, the salient feature extraction module 106 may comprise one or more of: a pore types and abundance module for determining pore types and their abundance; a skeletal grains and abundance module for determining skeletal grains and their abundance; and a non-skeletal grains and abundance module for determining non-skeletal grains and their abundance. These modules may be implemented by the salient feature extraction module 106, or as separate modules, or in combination, as appropriate.

For example, salient features may relate to one or more of pore types, their relative quantities (e.g. abundant, common, rare and none, based on the area occupied on the image by the feature), and skeletal/non-skeletal grains. In examples, extracting the salient features comprises performing image semantic segmentation using encoder-decoder convolution neural network processing, for example as will be described in more detail later below. In examples, the salient feature extraction module 106 is a trained salient feature extraction module based on a trained encoder-decoder convolution neural network as will be described in more detail later below. In examples, the encoder-decoder convolution neural network processing may be implemented using U-Net (Olaf Ronneberger, Philipp Fischer and Thomas Brox, 2015, U-Net: Convolutional Networks for Biomedical Image Segmentation, paper arXiv:1505.04597), although it will be appreciated that other implementations could be used.

In examples, the salient feature extraction module 106 is operable to extract salient features from the one or more attributes of the rock samples so as to generate the salient feature data, for example so as to implement the step s14. It should be understood that in the context of the examples of the disclosure that the term extracted, extract, extraction, and similar words derived from the root "extract" may also be considered to relate to identification of salient features, as well as, for example, identification of abundance of the identified salient features.

At a step s16, semantic text processing is applied to the salient feature data, using the semantic text processing module 108, so as to generate rock sample text data indicative of the one or more attributes of the rock samples. For example, the rock sample text data may comprise descriptive text relating to a textual description of the thin section rock sample or samples. In examples, the semantic text processing module 108 is operable to apply semantic text processing, such as natural language processing, to the salient feature data so as to generate rock sample text data indicative of the one or more attributes of the rock samples, for example to implement the step s16. Semantic text processing according to examples of the disclosure will be described in more detail later below. In examples, the semantic text processing module 108 is based on a trained Long short term memory (LSTM) recurrent neural network generated from supervised learning as will be described in more detail later below.

At a step s18, the input rock sample text data is stored using the storage module 109.

At a step s20, a rock image database is searched, using the search module 110, for categorised images that are similar to the captured images based on the sorted rock sample text data and database text data associated with the categorised images stored in the rock image database. In examples, the rock image database comprises categorised images of categorised rock samples and the database text data, and the database text data is indicative of one or more attributes of the categorised rock samples and is associated with petrophysical measurements of the categorised rock samples, for example permeability and porosity.

Therefore, for example, the thin sections may be associated with corresponding petrophysical qualities such as permeability and/or porosity. In examples, the search module 110 is operable to search an image database based on, the rock sample text data, database text and porosity data associated with images stored in the database, for example to implement the step s20. In examples, the search of the image database is additionally based on helium measured porosity (from the original rock sample the thin section was made from).

In examples, the rock image database may comprise a library of images which have previously been categorised and analysed, for example by one or more petrographers and/or by an automated process. Generation of a suitable rock image database will be described in more detail later below. In examples, the rock image database may correspond with the thin section image database mentioned above, although it will be appreciated that they could be different.

At a step s22, output data is generated dependent upon a degree of similarity between the rock sample text data and the database text data so that the output data indicates petrophysical properties of the carbonate rocks associated with the thin sections of input rock samples that are identified as being within a selected degree of similarity to the categorised rock samples in the rock image database based on a comparison of the stored rock sample text data with the database text data, and in which the output data is based on the petrophysical measurements of the categorised rock samples identified as being within a selected degree of similarity to the input rock samples. In some examples, the output data is generated dependent upon a degree of similarity between helium measured porosity, the rock sample text data, and the database text data.

In examples, at the step s22, the output data is output for simulation analysis. In examples, the output data comprises a textual description of the petrophysical properties of the carbonate rocks. In examples, the textual description may be based on the output of the semantic text processing module 108, for example so as to provide a descriptive text output with a similar style to that which may be written by a petrographer. In examples, the output module 112 is operable to generate output data dependent upon a degree of similarity between the rock sample text data and the database text data, and to output the output data for simulation analysis, for example to implement the step s22.

Figure 3:
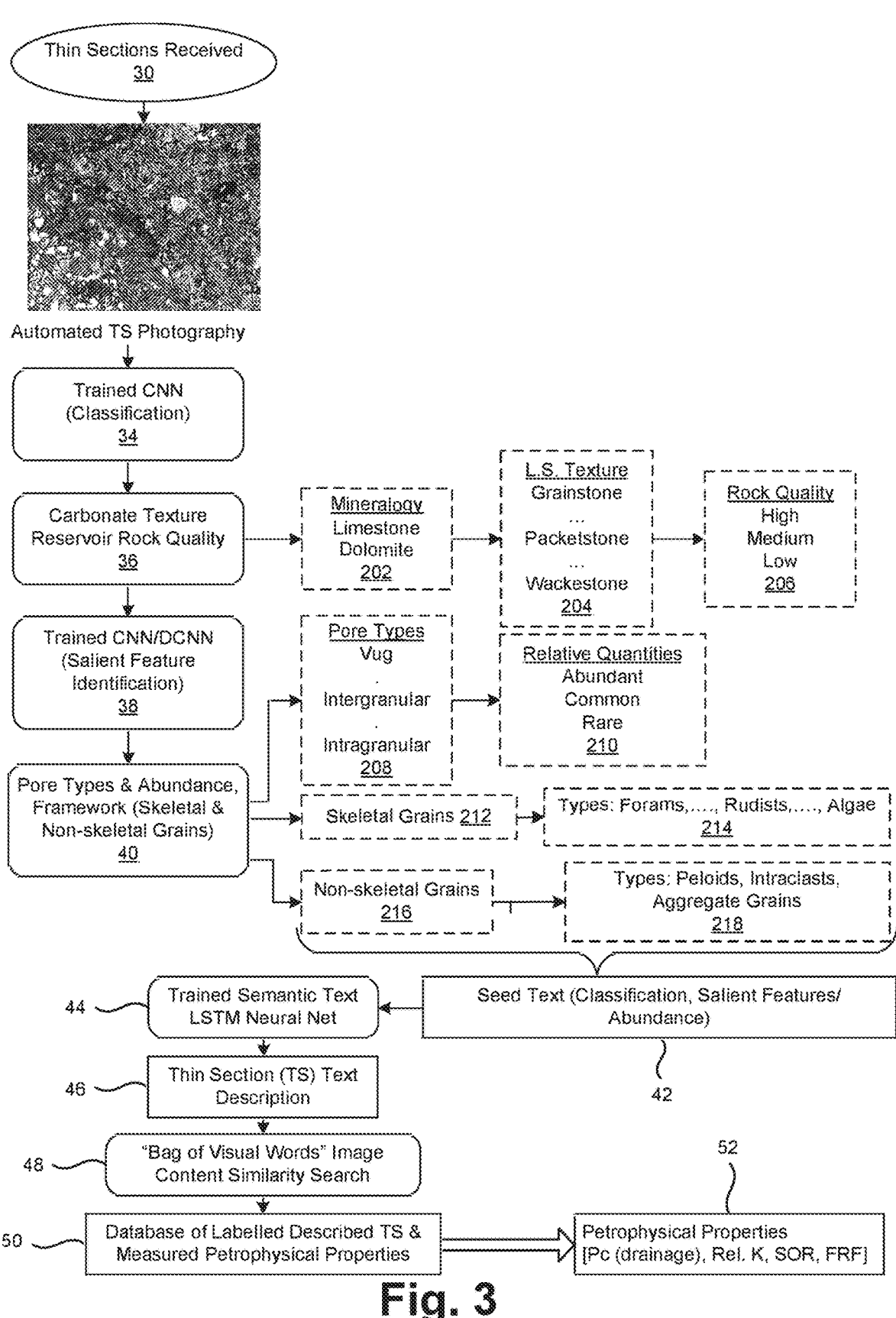
FIG. 3 is a process flowchart illustrating a method for categorising thin sections of rock samples obtained from carbonate rocks.

A method according to examples of the disclosure will now be described in more detail with reference to FIG. 3. FIG. 3 is a process flowchart illustrating a method for categorising thin sections of rock samples obtained from carbonate rocks according to examples of the disclosure. In particular, FIG. 3 shows further details of the method described with respect to FIG. 1.

At a step s30, thin sections may be received, for example from undergoing suitable processing from core samples, such as slicing, staining and polishing as described above and as is known in the art. At a step s32, images of thin sections may be captured, for example via automated thin section photography, using a suitable imaging device. In examples, the captured images may be stored in the thin section image database. In examples, the steps s30 and s32 may be implemented as part of the step s10, although it will be appreciated that they could be implemented separately and/or at different locations/stages from each other.

At a step s34, trained convolution neural network (CNN) processing may be used to classify the rock samples, for example by using the classifying module 104. For example, at a step s36, the thin section rock samples may be classified according to carbonate texture and reservoir rock quality. In some examples, the thin section rock samples may be classified at the step s36 according to dolomite, and rock quality classes.

In examples, the step s36 may output thin section attribute data indicative of a first attribute 202, a second attribute 204 and a third attribute 204. In examples, the first attribute 202 relates to mineralogy such as whether the thin section is classified as limestone or dolomite (for example based on presence or absence of distinctive dolomite crystals). In examples, the use of Alizarim Red-S staining and/or source plug grain density may be used to estimate the presence and percentage of dolomite which may offer an improved approach.

In examples, the second attribute 204 relates to Limestone Modified Dunham (1971) texture such as whether the texture is classified as Grainstone, Packestone, Wackestone or other texture. In examples, the third attribute 206 relates to the rock quality, such as whether the thin section is classified as high, medium, or low rock quality. In examples, the reservoir rock quality relates to the ability to store and flow hydrocarbons (e.g. through rock porosity and rock permeability respectively) and is a qualitative measure. However, it will be appreciated that the thin sections could be classified according to other attributes and that some attributes may be omitted. It will also be appreciated that the steps s34 and s36 may be implemented as part of the step s12 of FIG. 1, although other classification methods could be used.

At a step s38, a trained encoder-decoder convolution neural network, (for example U-Net) may be used to extract (identify), at a step s40, salient features such as pore types and abundance, and framework (e.g. skeletal and non-skeletal framework grains) based on feature identification carried out at the step s38, for example by using the salient feature extraction module 106. In examples, the step s40 may output salient feature data. In other words, for examples, the trained encoder-decoder CNN is operable to perform salient feature identification. In examples, the salient feature data relates to one or more of: a first salient feature 208 having a first subset 210 of salient features; a second salient feature 212 having a second subset 214 of salient features; and a third salient feature 216 having a third subset of salient features 218.

In examples, the first salient feature 208 may comprise a set of salient features and the first subset 210 may comprise relative quantities relating to the salient features in the set of salient features. In examples, the first salient feature 208 relates to pore types; such as small vug, large vug, intergranular, and intragranular. In examples, the first subset 210 relates to the relative quantities of the identified pore types such as whether they are considered to be abundant, common, or rare. In examples, the terms abundant, common, and rare may be associated with threshold levels indicative of their numerical frequency of typical occurrence, for example, based on the statistical analysis of previous samples. In examples, the terms abundant, common, and rare may be associated with the area of the thin section image covered, for example a number of individual machine predicted pixel category class labels divided by the total number of pixels forming the image. In examples, the total number of individual pore pixels divided by the total number of image pixels is labelled "visual porosity" (fraction). At an optical magnification of 2 to 2.5×, microporosity is not visible in these examples. Therefore, the difference between measured helium TS source plug total helium porosity and "visible porosity" may be used to provide a qualitative estimate of the volume fraction of the rocks microporosity (pores typically less than 10 microns maximum diameter).

In examples, the second salient feature 212 relates to whether the thin section is identified as having skeletal grains, and the second subset 214 relates to possible identified types, such as forams, rudists, and algae, although it will be appreciated that other types could be identified.

In examples, the third salient features 216 relates to whether the thin section is identified as having non-skeletal grains and the third subset 218 relates to possible identified types; such as peloids, intraclasts, and aggregate grains, although it will be appreciated that other types could be identified. In examples, the salient features identified at the steps s38 and s40 may be used to generate seed text, such as that relating to classification, salient features/abundance at step s42. In examples, one or more of the steps s38, s40 and s42 may be implemented at the step s14 of FIG. 1.

In examples, at a step s44, a trained semantic text Long Short Term Memory (LSTM) neural network is used to generate, at a step s46 thin section descriptive text. For example, the step s46 may output one or more sentences indicative of attributes and/or salient features related to the thin section rock samples as will described in more detail later below. In examples, the steps s44 and s46 may be implemented at the step s16 of FIG. 1, for example by the semantic text processing module.

At a step s48, and image content similarity search may be performed, for example based on a "bag of visual words". In this context, a "bag of visual words" may be considered to relate to binned unordered descriptive words which form a category histogram, for example in relation to visual descriptors of the thin sections as will be described in more detail below. The similarity search may be performed at a step s50 on a database of labelled, described thin sections (such as captioned thin section images) and their related measured petrophysical properties, such as the image database mentioned in relation to the step s20 of FIG. 1 above. In other words for example, the similarity search may be based on a comparison between the captured images and categorised images based on the stored rock sample text data and the database text data associated with the categorised (captioned) images as mentioned above.

In examples, a degree of similarity may be used to generate, at a step s52 output data relating to petrophysical properties such as capillary pressure (Pc), relative permeability (Rel-K), saturation oil remaining (SOR), and formation resistivity factor (FRF). In examples, the step s48 and s50 may be implemented at the step s20 of FIG. 1, and the step s52 may be implemented at the step s22. In some examples, the step s50 may be implemented at the step s22 of FIG. 1.

In examples, the output data indicates petrophysical properties of the carbonate rocks associated with the thin sections of input rock samples that are identified as being within a selected degree of similarity to the categorised rock samples in the rock image database, based on a comparison of the stored rock sample text data with the database text data, for example, within a user defined helium porosity range. As mentioned above, the output data is based on the petrophysical measurements of the categorised rock samples identified as being within a selected degree of similarity to the input rock samples. For example, input thin sections which have similar image properties as images of thin section stored in the rock image database are more likely to share the same physical properties as each other.

In examples, one or more steps of FIGS. 1 and 3 may be combined, for example, to implement a stacked neural net model of varying architectures to deliver one or more of: Classification of Reservoir Rock Textures (e.g. High, Medium, Low Reservoir Quality (RQ) Classifications) for example at the step s36, Pore Type Classification and Subjective Quantity for example at the step s40, Framework Grain Type Classification and Subjective Quantity for example at the step s40, Right order words text description of image classification and contents for example at the step s44 and s46, and Petrophysical Properties (Pc (drainage), Rel-K, SOR, FRF, etc.) for example at the step s52. It will also be appreciated that the steps described herein with respect to FIGS. 1 and 3 may be implemented in different orders as appropriate, not just in the order in which they are described herein.

FIG. 4A is a schematic diagram of a general implementation of a convolution neural network according to examples of the disclosure. In examples, a trained convolutional neural network is used to classify images of 2D thin section rock samples. Referring to FIG. 4A, in an example, image data 300, such as thin section image data generated from captured images of input rock samples, is input to a trained convolutional neural network 301. The trained convolution neural network 301 may be of any suitable type. An example of a trained convolution neural network that may be used is described below with reference to FIG. 4B, but it will be appreciated that other types and arrangements of trained convolution neural networks may be used. In examples, the trained convolution neural network may be implemented by the classifying module 104. In examples, an output 326 of the trained convolution neural network 301 provides carbonate rock classification, such as that relating to texture, reservoir rock quality, mineralogy (e.g. dolomite vs limestone).

FIG. 4B is a schematic diagram of one possible implementation of a trained encoder-decoder convolution neural network according to examples of the disclosure. In examples, the trained convolution neural network of FIG. 4B may be implemented by the classifying module 104 to implement the step s12.

Referring to FIG. 4B, in an example, the image data 300, such as thin section image data, is input to the trained convolution neural network 301. In the example of FIG. 4B, the trained convolution neural network 301 comprises: a convolution layer 302; a max-pooling layer 304; a convolution layer 306; a max pooling layer 308; a convolution layer 310; a max pooling layer 312; a fully connected layer (Flatten) 314; a fully connected layer 316; a fully connected layer (Classifier) 318; and a fully connected layer (Class Probabilities) 320.

In examples, there is an intermediate layer between each fully connected layer or convolutional layer. In examples, each intermediate layer uses a ReLU (rectified linear units) nonlinear activation function (such as ReLu activation functions 322a-e) and each convolution layer uses a 3×3 filter with a stride of 1 and VALID padding.

In examples, the Max-pooling filters have a dimension of 2. In examples, the output of the trained convolution neural network 301 is via Softmax activation functions 324, for example to generate the output 326, although other activation functions could be used. Another example of a convolution neural network architecture is given in FIG. 20. However, it will be appreciated that other types and arrangements of convolutional neural network could be used. For example, the convolution neural network 301 could be based on AlexNet, Network in Network (NiN), VGG Net, GoogLeNet, ResNet, Inception/Xception or other suitable convolutional neural network.

It will also be appreciated that any number of layers could be used as appropriate. For example, the layers 302 and 304 could be omitted with consequential omission of the activation function 322a. More generally, in examples, the convolutional neural network comprises an intermediate layer between two convolutional layers. In examples, the intermediate layer comprises using a rectified linear units (ReLU) nonlinear activation function. More generally, in examples, the convolutional neural network processing for example implemented by the classifying module comprises using two or more or: a convolution layer; a max pooling layer; and a fully connected layer. In examples, an intermediate layer may comprise a max pooling layer. In examples, a max pooling layer in combination with a nonlinear activation function may together be considered as an intermediate layer.

In examples, the convolutional neural network may previously have been trained and/or tuned using an appropriate dataset. In examples, a large (typically 1,000 s), unbiased (e.g. a balanced number of texture and reservoir quality examples) and accurately labelled image database is used. Labels may consist of one label or several labels per image overview, labels for each segmented object, region or feature within an image. Since segmentation labelling of objects, regions and features is often labour intensive, methods such as bounding boxes, polygon chains, brushing, edge detection, colour, watershed transform, clustering, or other suitable method may be used to label objects. In examples, training, verification and blind test datasets may consist of colour, pixel size images in 8 bit portable network graphics (png) file, 8 to 16 bit tagged image file format (tiff) or other lossless format. In examples, original images are used for training and/or tuning and are not pre-processed, sharpened or colour altered except for pore system processing where the image is converted to a binary image, black for rock and white for pores. Image size reduction occurs for all images. However, it will be appreciated that in other examples, one or more of the images may be pre-processed. Training of the convolution neural network will be described in more detail later below with reference to FIG. 17.

In order to help identify salient features such as pore types, grains and skeletal material within the images of the thin section rock samples, in examples, semantic segmentation may be carried out. For example, FIG. 5 is an image showing bounding polygon chain labelling of foraminifera in a thin section image of a rock sample. In particular, the example of FIG. 5 illustrates skeletal grain object annotation of Benthonic Foraminifera in Packstone. In FIG. 5, the indicated scale is 2.0 mm by way of example, and the outlines such as outline 402 represents a bounding polygon chain.

Figure 6:
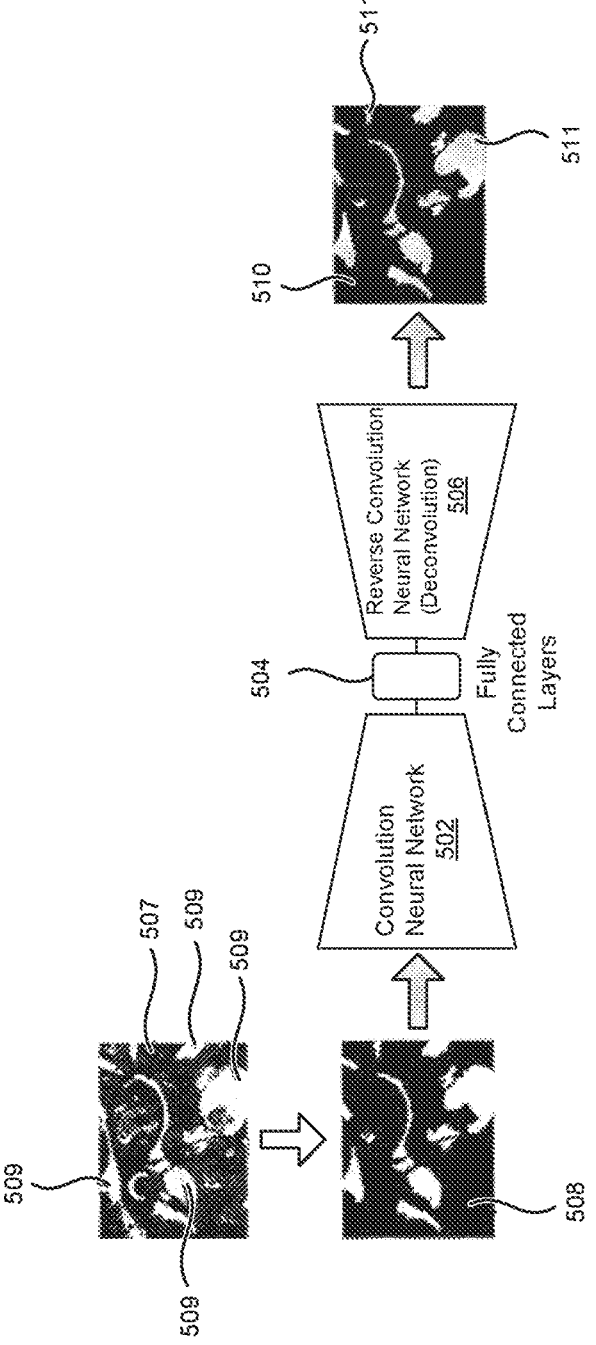
FIG. 6 is a schematic diagram of implementation of a trained neural network according to examples of the disclosure.

FIG. 6 is a schematic diagram of implementation of a trained neural network according to examples of the disclosure. In particular, FIG. 6 shows an example of use of salient feature trained neural network to perform semantic segmentation. Referring to FIG. 6, in examples, the salient feature trained neural network comprises an encoder 502 which is a convolution neural network (encoder), a plurality of fully connected layers 504, and a decoder 506 which is a reverse convolution neural network (often referred to as a deconvolution neural network or decoder). In examples, semantic segmentation may help achieve fine grain inference by making dense predictions inferring labels for every pixel.

In examples, the salient feature trained neural network is trained to recognize objects, regions and features by feeding (for example by supervised learning) a large number of the labelled images (typically 1,000 s). In examples, the training dataset comprises a plurality of images of carbonate formation 2D thin slices with labelled objects, regions and features enclosed within bounding polygons, such as those shown in FIG. 5.

In examples, the encoder 502 is substantially the same as the classifying convolutional network described above with respect to FIG. 4B but without the fully connected layers. In examples, the decoder 506 is a reverse deconvolution neural network which semantically projects discriminative, low resolution features learned by the encoder onto pixel high resolution space to obtain a dense classification. For example, the decoder may be implemented according to a suitable processing scheme such as DeconvNet, DeepLab-CRF, Dialated Convolutions, SegNet, although it will be appreciated that other suitable deconvolutional neural networks could be used. For example, U-Net (Olaf Ronneberger, Philipp Fischer and Thomas Brox, 2015, U-Net: Convolutional Networks for Biomedical Image Segmentation, paper arXiv:1505.04597) may be used for microscopic image semantic segmentation.

Referring to FIG. 6, in examples, a thin section original colour image 507 comprising blue epoxy filled pores 509 may undergo colour conversion to black & white binary via pre-processing so as to generate a thin section input image 508. In the example of FIG. 6, the thin section input image 508 is a pre-processed image in which optical visible blue pores are shown as white, and rock is shown as black, with an optical pore area of 18%. In examples, the thin section input image 508 may be input to the encoder 502, and passed through the fully connected layers 504 to the decoder 506 so as to generate a segmentation output mask image 510 indicative of pore type, for example comprising a mouldic pore image mask 511. In the example shown in FIG. 6, the pore type is considered to be mouldic spores, although it will be appreciated that other salient features may be identified by the salient feature trained neural network. In other words, for example, the segmentation output mask image 510 may indicate pore type identification and abundance.

FIG. 7 schematically shows a spreadsheet analysis of salient features according to examples of the disclosure. In the example shown in FIG. 7, the spreadsheet analysis is manually generated by a Petrographer and is a spreadsheet analysis of carbonate thin section salient features.

In examples, the output of the salient feature trained neural network is written to a spreadsheet, for example in the same or substantially the same format as that shown in FIG. 7. In other words, for example, the salient feature neural network may be used to implement the steps s38, s40, and s42 of FIG. 3, and/or the step s14 of FIG. 1.

FIG. 8A is a schematic diagram of a semantic text processing arrangement according to examples of the disclosure. In particular, FIG. 8A schematically shows an example of a trained semantic text neural network 650 that may be implemented in performing the steps s44 and s46 of FIG. 3 and/or the step s16 of FIG. 1. In examples, the trained semantic text neural network 650 comprises a recurrent neural network. In other words, in examples, the semantic text processing comprises applying recurrent neural network processing to classification and features seed text 601, for example as generated at the step s42. In examples, the recurrent neural network processing comprises applying a Long Short Term Memory (LTSM) stacked network to the seed text (such as that relating to the salient feature data) to generate a textual summary of image content of the image data. In examples, the semantic text processing helps deliver short, meaningful summaries of image contents (such as objects, features and regions). In other words, for example, the trained semantic text LSTM neural network may output rock image descriptive sentences 603.

In examples, Long Short Term Memory (LSTM) stacked networks may be used to decode labels and label modifiers into short, meaningful summaries of image contents. In examples, the LSTM network may be used to help predict the sequence of words in the petrophysical description and build up the description based on the words previously generated. In examples, technical language training using a Petrographer's technical vocabulary may be used to help teach the LSTM model to understand the start and end of labelled descriptive text sequences. Generation of a trained semantic text LSTM neural network 650 according to examples will be described in more detail later below with reference to FIG. 19.

FIG. 8B shows a specific example of implementation of a LSTM neural network which may be used according to examples of the present disclosure. However, it will be appreciated that other arrangements are possible. For example, referring to FIG. 8B, the thin section input image 600 may be provided, for example according to step s10, and/or steps s30 and s32. In the example shown in FIG. 8, a trained feature extractor 602 based on convolution and deconvolution networks (for example corresponding to that described above with reference to FIGS. 4A and 4B to 7, and steps s34 to s42) may be used to generate short sentence thin section image descriptions based on previous object and attribute discovery. In other words, for example, seed text such as that relating to classification and features of the carbonate rock samples may be input to the trained semantic text LSTM neural network 650.

Referring to the example of FIG. 8B, a plurality of reservoir quality descriptors may be used, such as HRQ (high reservoir quality), MRQ (medium reservoir quality), and LRQ (low reservoir quality). In the example of FIG. 8B, processing using the trained semantic text LSTM neural net 650 may occur via "Label [<start>, MRQ, Grainstone, with, abundant, intergranular, porosity, and, copious, Peloids.] Target [MRQ, Grainstone, with, abundant, intergranular, porosity, and, copious, Peloids. <end>] although it will be appreciated that other suitable targets and labels could be used. In the example shown in FIG. 8B, Wemb is a word embedding vector which is input to a LSTM, and Softmax indicates use of the Softmax classifier function. However, it will be appreciated that other arrangements of a trained LSTM neural network could be used as appropriate.

FIG. 9 schematically shows images related to word bins of an image search according to examples of the disclosure. As mentioned above, in examples, at the step s20, an image database is searched based on the rock sample text data and database text data associated with images stored in the database. In examples, an image content search is used to locate database images, with visual descriptions most similar to the new image (such as a thin section rock sample image provided at the step s10), so as to rank their similarity and extract their associated laboratory measured fluid flow and petrophysical properties (e.g. relative permeability (Rel-K), capillary pressure (Pc), saturation remaining oil (SOR), and formation resistivity factor (FRF)). For example, visually similar images may generally have similar petrophysical and fluid flow properties and so, based on the similarity, an indication of the petrophysical qualities of the rock sample from which the thin section image has been captured may be obtained.

Known reverse image search techniques may be employed to search for similarities between the input images and the database images. In examples, text based image retrieval (TBIR) may be used, although it will be appreciated that content based image retrieval (CBIR) could be used instead of, or as well as TBIR. Typically TBIR based on word descriptions of images are subject to the accuracy and consistency of the description. Therefore, stringent quality control may be required during construction of the labelled image database. Content Based Image Retrieval (CBIR) may be used as an alternative but data access may be slower.

As mentioned above, in examples, a "bag of visual words" image similarity search may be performed, for example to implement the step s20. Referring to FIG. 9, in examples, binned unordered descriptive words 702 may be used to form a category histogram 704. In examples, the category histogram may be associated with the image from which it was generated so as to generate a numerical descriptor of that image. In the example of FIG. 9, pore types are defined with the following numerical indicators in parentheses: abundant (3), common (2), rare (1), and absent (0). In examples, framework is defined with the following numerical indicators in parentheses: copious (3), frequent (2), infrequent (1), and absent (0). However, it will be appreciated that other numerical indicators and classifications could be used. More generally, in examples, an output image may be associated with a numerical descriptor indicative of one or more attributes of that image. The use of a numerical descriptor may help reduce the amount of data that needs to be stored. Furthermore, the use of a numerical descriptor for example may help speed up similarity processing.

Referring to the example of FIG. 9, an input image 706 with corresponding descriptor 708 may be compared with a plurality of images stored in a database 709 of human and/or machine described images of thin sections and their associated petrophysical and fluid flow properties. In examples, the descriptor may be a descriptor index number such as those shown in FIG. 9 (e.g. the terms descriptor and descriptor index number may be used interchangeably, but it will be appreciated that the descriptor need not be limited to an index number). Referring to the example of FIG. 9, a database image 710 has an associated descriptor 712, a database image 714 has an associated descriptor 716, and a database image 718 has an associated descriptor 720. In the example of FIG. 9, the database image 718 is determined to be most similar to the input image 706 based on their associated descriptors 708 and 720, and so the database image 718 may be output together with corresponding petrophysical and fluid flow properties such as water-oil Rel-K 722, capillary pressure 724, and porosity and permeability measurements 726. Therefore, for example, petrophysical attributes of thin section rock samples may be more quickly and easily determined. Additionally, for example, the use of semantic text processing may help provide an output that is more compatible with current workflows, and thus also allow easier integration into existing systems.

In examples, one or more search terms may be user selectable. For example, a user may select to search by reservoir quality (e.g. high, medium, low), by porosity or permeability range, or other suitable parameter. In examples, a number of bin matches between the input image and the database images count towards a similarity score. In other words, more generally, in examples the output data is dependent upon a degree of similarity between the rock sample text data and the database text data.

In examples, salient features such as pore type, grains and skeletal abundance rankings may be used as weighing functions. In examples, attributes such as texture and reservoir quality may be used as search filters.

In examples, the degree of image similarity is user selectable. For example, the degree of similarity may be user selected for example using a selection slider 711. In examples, 0.9 is set as a default value of similarity, although it will be appreciated that any other suitable value could be used. In examples, the degree of similarity may be those images that are considered to be most similar, for example based on their associated descriptors. In examples, the user may filter within porosity and/or permeability ranges instead of Reservoir Quality. In some examples, the system is arranged so that a user may restrict searching of the database based on one or more of the following: human described samples (e.g. an original labelled database); human and machine described images; and images with a particular type of petrochemical measurement. However, it will be appreciated that other search restrictions and search criteria could be employed as appropriate.

In examples, one or more database images that are deemed to be within a similarity threshold of the corresponding descriptor of the input image may be output. For example, the four top ranked (4) similar images may be displayed along with their associated petrophysical measurements. In examples, a number of images that may be output with their associated petrophysical properties may be user selectable. In examples, top ranked petrophysical measurements may be averaged together at a user's discretion, for example as a mean average.

FIGS. 10 to 15 show examples of attributes, salient features, and associated petrophysical qualities that may be identified according to examples of the disclosure.

FIG. 10 shows example images of different grades of reservoir rock quality. In the example shown in FIG. 10, different grades of reservoir rock quality with high porosity, high permeability (attributes of High Reservoir Quality (HRQ)) and low porosity, low permeability (attributes of Low Reservoir Quality (LRQ)) are shown.

For example, the step s12 may classify a thin section according to reservoir rock quality, for example high medium or low quality based on image analysis as mentioned above. In the example of FIG. 10, finer grained dolostone for example as indicated in image 802 may be considered to be a lower reservoir rock quality than more coarsely grained dolostone as indicated in image 804. Also, referring to the example of FIG. 10, a thin section image 806 identified as comprising grainstone may be considered to relate to a high reservoir rock quality, a thin section image 808 identified as comprising packstone may be considered to relate to a medium reservoir rock quality, and a thin section image 810 identified as comprising wackestone may be considered to relate to a low reservoir rock quality.

Table 1 below shows an example of a Petrographer's interpretation spreadsheet displaying reservoir quality and modified Dunham classification as numbers. In examples, the classifying module 104 is operable to output reservoir quality output data, for example in a format based on that indicated in the example of Table 1.

FIGS. 11A to 11C show example images of common pore types in limestone reservoir rocks, and FIG. 12 shows an example of different classifications of pore types in limestone.

Referring to the example of FIGS. 11A-110, FIG. 11A shows an example image of a grainstone with well interconnected intergranular pore type, FIG. 11B shows an example image of intragranular pore types associated with Lithocodium fragments, and FIG. 11C shows an example image of wackestone with mouldic pore type. In examples, the images of FIGS. 11A-11C may be used as examples of training images. In other examples, they may relate to input images for example provided at the step s10.

TABLE 1

| | | | | | | | | |
|---|---|---|---|---|---|---|---|---|
| | | | | Reservoir | | | | |
| | Diagenetic components | | | Depositional components | | | | |
| | | | | Lithology | | | | |
| | | | | Limestone | | | | |
| | | | | Texture | | | | |
| | | | | Grain dominated | | | | |
| | | | | Texture and composition | | | | |
| Reservoir Quality (cementation and compaction) | Cement (pressure solution) | Dolomite | Mud-dominated | Packstone | Algal dominated floatstones/ rudstones | Rudist dominated floatstones/ rudstones | Mud-lean packstone/ grainstone | Non-reservoir |
| High | 3 | 30 | 32 | 34 | 35 | 36 | 37 | 1 |
| Medium | | 20 | 22 | 24 | 25 | 26 | 27 | |
| Low | | 10 | 12 | 14 | 15 | 16 | 17 | |

FIG. 12 shows an example of a hierarchy of pore types in limestone in which primary pore types comprise matrix I type, intragranular type, and intergranular type, and secondary types comprise matrix II type within grains type, moldic type, pin point type, and vugs type. For example, at the step s12, a thin section may be classified according to an identified pore type, for example according to a type indicated in FIG. 12.

FIG. 13A shows an example image of a thin section rock sample with skeletal grains, and FIG. 13B shows an example image of a thin section rock sample with non-skeletal grains. As mentioned above, salient features may relate to presence or absence of skeletal or non-skeletal grains. FIG. 13A shows an example image of skeletal grains comprising benthonic foraminifera 3001, and FIG. 13B shows an example of non-skeletal grains comprising peloids 3002. For examples, salient features may relate to skeletal or non-skeletal features categorised according to the example of Table 2 below.

TABLE 2

| Skeletal | Non-Skeletal |
| --- | --- |
| Benthonic Foraminifera | Peloids |
| Miliolids | Intraclasts |
| *Orbitolina* | Aggregate Grains |
| *Palaeodictyoconus arabicus* | |
| Rudist Bivalves | |
| *Lithocodium-Bacinella* (Alga) | |

In examples, the salient features module is operable to extract (identify) salient features for example by identifying salient features such as the second salient feature 212 and the third salient feature 216 described above with reference to FIG. 3.

FIG. 14 shows example plots of porosity-permeability relation for limestone. FIGS. 15A to 15C shows example images and associated permeability plots for different quality grainstones. In other words, for example, FIGS. 14 and 15A-15A show examples of petrophysical qualities which may be associated with thin section images for output, for example implemented at the step s22.

In examples, instead of, or as well as spreadsheet data may be output at the step s22 comprising numeric codes representing image attributes such as texture, mineralogy (dolomite vs calcite), abundant to rare pore types, copious to infrequent frameworks, and the like. However, it will be appreciated that the numeric codes could be output in any appropriate format. Additionally, it will be appreciated that the numeric codes could be associated with petrophysical attributes such as those shown in the examples of FIGS. 14 and 15A-15C and/or as described above with reference to FIG. 9. Although various neural network architectures are mentioned herein, it will be appreciated that many different types of neural network architecture may be used and that one or more neural network architectures could be combined as appropriate. For example, open source computational libraries (such as Caffe, Caffe2, CNTK, Keras, PyTorch, Theano, TORCH, TensorFlow, etc.) may provide convenient tools for constructing modals.

Generation of example databases and training of neural networks according to examples of the disclosure will now be described in more detail with reference to FIGS. 16 to 19.

FIG. 16 is a schematic representation of the manual generation of a labelled image training database. Referring to FIG. 16, a labelled image training database may be generated based on observing and labelling a plurality of carbonate reservoir rock samples including providing qualitative assessment of salient feature abundance. For example, this may involve manual labelling of thin section images, at a step s1000, by an expert Petrographer. In examples, the training images are associated with corresponding metadata indicative of one or more attributes of the image. In examples, the Petrographer may manually input the metadata for storage in the labelled image training database.

In examples, this may include classification and labelling of the entire thin section (TS) image at a step s1002 such as texture, mineralogy and reservoir quality, although it will be appreciated that other attributes or features of the thin sections could be labelled as appropriate. In examples, segmentation and feature labelling may be carried out at a step s1004, such as that relating to pore type and abundance, and framework. For example, an input training image 1006 corresponding to the example image, of FIG. 13A mentioned above, may be classified and labelled by an expert Petrographer according to unordered descriptive words (for example using a limited/controlled vocabulary) such as descriptive words 702 mentioned above. In examples, the Petrographer may label and annotate feature regions (such as regions 1008*a*, 1008*b*) of the input training image.

In examples, the Petrographer may classify pore types and annotate and/or generate associated metadata associated with the image, for example for an input training image 1010, e.g. in a similar manner to the pore types mentioned above with reference to FIGS. 11 and 12. In examples, the Petrographer may classify the images as having skeletal grain (such as in image 1006) and/or non-skeletal grains (such as image 1012) and record this in the metadata associated with the image. For example, the Petrographer may observe and label carbonate reservoir rock samples as to Texture, Mineralogy, Reservoir Rock Quality (High, Medium, Low), as well as segment and annotate salient image features such as: Pore types (Primary & Secondary); Skeletal (e.g. Benthonic Foraminifera, Miliolids, Obitonia, Palaeodictyoconus arabicus, Rudist Bivalves, Lithocodium-Bacinella) and Non-Skeletal (Peloids, Intraclasts, Aggregate Grains) grains. The Petrographer may also provide qualitative assessments of salient feature abundance and record this in the image metadata. The labelled image training database may thus be considered to be a labelled/annotated image database for example.

FIG. 17 shows a process flowchart implementing image recognition supervised learning. In examples, the trained convolutional neural network for the classifying module may be generated by using supervised learning based on a first subset of the labelled image training database so as to classify the rock training images. For example, the convolution neural network may be trained to classify carbonate rock images as to attributes such as Texture, Mineralogy and Reservoir Rock Quality using a subset (or portion) of the data in the labelled image training database. Referring to FIG. 17, at a step s1100, training set thin section images may be input to a convolution neural network training module based on data of the labelled image training database.

At a step s1102, a neural network architecture is selected, such as number or neurons, number and/or type of layers, and the like as will be known by the person skilled in the art. At a step s1104, neural network image supervised learning is carried out so as to classify the carbonate rock images as is known in the art.

At a step s1106, a validation set of thin section images and metadata is provided, for example based on a validation subset of images of the labelled image training database which is different from the first subset. Then at a step s1108, model accuracy assessment is carried out, based on the validation subset. Based on the outcome of the model accuracy assessment, the neural network architecture selection may be updated at the step s1102, and/or further supervised learning carried out at the step s1104.

Once a sufficient degree of accuracy has been obtained at the step s1108, a set of blind test thin section images and metadata are input at a step s1110 so that an accuracy assessment may be carried out at a step s1112. If the model is not deemed to be sufficiently accurate (e.g. less than a threshold degree of accuracy), then further supervised learning may be carried out at the step s1104. If the model is deemed to be sufficiently accurate (e.g. greater than a threshold degree of accuracy), then at a step s1114, a trained inference model is output for the convolution neural network. In other words for example, the convolution neural network implemented by the classifying module 104 may be generated based on the example of FIG. 17 using known techniques.

In examples, the encoder-decoder CNN implemented by the salient feature extraction module 106 may be trained in a similar manner to that described above with respect to FIG. 17, for example, to recognize carbonate reservoir rock features and their abundance in images, such as Pore type, Skeletal and Non-skeletal grains using a subset of the labelled training image database. More generally, in examples, the trained convolution deconvolution neural network for the trained salient feature extraction module may be generated using supervised learning based on a second subset of the labelled image training database so as to recognise carbonate reservoir rock features and their abundance.

In other words, in examples, the labelled image training database may be used to train convolution (CNN) and encoder-decoder convolution neural nets of varying architectures to a satisfactory accuracy. In examples, labelled/annotated images may be repeatedly displayed (input) to the neural networks until the network 'learns' to recognize the unseen new images to a satisfactory accuracy (e.g. greater than a threshold accuracy).

In examples, a semantic text training database comprising text data comprising text data relating to descriptions of carbonate reservoir rock samples may be generated. FIG. 18 shows a process flowchart implementing thin section text file pre-processing. For example, the process described with respect to FIG. 18 may be used to generate a plurality of text files so as to form data entries for the semantic text training database, for example for natural language training. In examples, the data in the semantic text training database may be in the ASCII (American Standard Code for Information Interchange) format, although it will be appreciated that any other suitable format may be used.

Referring to FIG. 18, at a step s1200, a thin section (TS) descriptive ASCII text sentences file may be generated, for example, having limited descriptive words vocabulary (e.g. less than a threshold number of most frequently used words), and limited punctuation (e.g. only some punctuation characters are allowed) and/or word formation, for example so that commas, numbers, apostrophes, hyphens, and words ending in "ed" or "ing", are excluded. In examples, the text sentences may be based on metadata and descriptive sentences (e.g. relating to qualitative features of the rock samples) input by the Petrographer for example when generating the labelled image training database.

At a step s1202, words may be replaced with acronyms so as to reduce the data size. For example, "Low Reservoir Quality" may be replaced with "LRQ", "Medium Reservoir Quality" may be replaced with "MRQ", and "High Reservoir Quality" may be replaced with "HRQ".

At a step s1204, text file preparation may be performed including: converting to lower case at a step s1206, for example to reduce vocabulary size; sentence segmentation at a step s1208 to determine boundaries of sentences; tokenisation at a step s1210 for example to convert words and/or punctuation symbols into a list; and co-reference resolution at a step s1212 so as to determine a relationship of a word in a sentence with a previous word and the next sentence. At a step s1214, a cleaned text file may be output and saved into the semantic text training database.

FIG. 19 shows a process flowchart implementing thin section semantic text LSTM supervised learning, for example for the trained semantic text neural network implemented by the semantic text processing module 108. Referring to FIG. 19, at a step s1300, a cleaned text file, such as one generated according to the example of FIG. 18 may be input to a LSTM training module. At a step s1302, LSTM architecture selection is carried out, for example to determine the parameters and neurons of the LSTM neural network. At a step s1304, supervised learning is used to train the LSTM neural network based on the input text file(s).

Then, at a step s1306, validation seed text input based on the output of the trained convolutional neural network and the trained encoder-decoder convolution neural networks may be so that semantic text model accuracy assessment can be carried out at a step s1308.

If, at the step s1308, the semantic text model is determined to have an accuracy less than a first threshold degree of accuracy, then further training may be performed at the step s1304 and/or further architecture selection may be carried out at the step s1302. If the semantic text model is determined to have an accuracy greater than the first threshold degree of accuracy, then blind test seed text may be input at a step s1310, for example from the semantic text training database, so that model accuracy assessment can be carried out at the step s1312.

If, at the step s1312, the semantic text model is determined to have an accuracy less than a second threshold degree of accuracy, then further training may be performed at the step s1304. If the semantic text model is determined to have an accuracy greater than the second threshold degree of accuracy, then, at a step s1314 a thin section descriptive sentence model is output for use by the neural network of the semantic text processing module 108. In examples. The first threshold is different from the second threshold, although it will be appreciated that they could be the same. In other words, for example, the trained recurrent neural network for the semantic text processing module 108 may be generated by using supervised learning based on seed words from the trained convolutional neural network and the trained convolution deconvolution neural network.

For example, FIG. 19 may be considered to relate to training a Long-Short-Term-Memory recurrent neural net to deliver rock descriptive short sentences based on seed words from the classification and feature identification neural nets. Furthermore, in examples, the text file of image descriptive sentences trains a Long-Short-Term-Memory (LSTM) recurrent neural net to generate short semantic thin section descriptions. Those skilled in the art may recognize this as supervised learning.

In examples, a similar process to that of FIG. 16 may also be used to generate a measured rock properties database comprising rock property data associated with labelled and unlabelled rock training images. In examples, the rock property data includes petrophysical data such as porosity, grain density, capillary pressure, relative permeability. In examples, the output data, (for example generated at the step s22) may be based on data of the measured rock properties database. However, it will be appreciated that the generation of the measure rock properties database could be automated, such as by association of the images with previously categorised images using machine learning or other appropriate methods.

FIG. 20 shows an example of a convolution neural network (VGG 16—Open Source VGG16 Deep Convolution Neural Net, Karen Simonyan, Andrew Zisserman, 2014. Very Deep ConvNets for Large-Scale Image Recognition, ILSVRC Sep. 14, 2014 Workshop and arXi pre-print, arxiv.org/pdf/1409.1556v6/, Visual Geometry Group, University of Oxford, revision 6, Apr. 10, 2015.) architecture for implementation by the classifying module 104. In some examples, an encoder-decoder convolution neural net architecture such as U-Net may be used for semantic segmentation, for example for the neural network architecture selection mentioned above with respect to s1102 of FIG. 17, and/or for implementation as the convolution neural network implemented by the classifying module 104.

A further example of the techniques described here is shown in FIG. 21. FIG. 21 schematically shows images related to word bins of an image search together with a petrophysical property selection graph. The example of FIG. 21 is substantially the same as that described above with respect to FIG. 9. However, in the example described with respect to FIG. 21, a porosity permeability database comprising data relating to core plugs porosity/permeability from which thin sections were made, may be used to select search criteria. In the example of FIG. 21, a graph 740 displaying data from the porosity permeability database may be displayed on a suitable display device. A porosity search window 742 may be displayed so that the user may move the porosity search window 742 to a desired search region. For example, the search for similar images may be carried out on data points in the porosity permeability database that are within the porosity search window 742. For example, a search may be performed within a texture class for the most similar image related to the "bag of visual words", and/or optionally constrained by one or more of porosity, permeability, and reservoir quality. In other words, for example, the example of FIG. 21 may allow more flexible search criteria to be defined.

FIG. 22 schematically shows an automated system for implementing methods of examples of the disclosure. In particular, FIG. 22 shows an example of a computing device 2000 for example which may be arranged to implement one or more of the examples of the methods described herein. In examples, the computing device 200 comprises main unit 2002. The main unit 2002 may comprise a processor 2004 and a system memory 2006. In examples, the main unit 2002 is operable to receive data from the image data input module 102.

In examples, the processor 2004 may comprise a processor core 2008, a cache 2010, and one or more registers 2012. In examples, the processor core 2008 may comprise one or more processing cores and may comprise a plurality of cores which may run a plurality of threads. The processor 2004 may be of any suitable type such as microcontroller, microprocessor, digital signal processor or a combination of these, although it will be appreciated that other types of processor may be used.

In examples, the processor core 2008 may comprise one or more processing units. In examples, the processor core 2008 comprises one or more of a floating point unit, an arithmetic unit, a digital signal processing unit, or a combination of these and/or plurality of other processing units, although it will be appreciated that other processing units could be used. In examples, the cache 2010 may comprise a plurality of caches such as a level one cache and a level two cache, although other appropriate cache arrangements could be used.

In examples, the processor 2004 comprises a memory controller 2014 operable to allow communication between the processor 2004 and the system memory 2006 via a memory bus 2016. The memory controller 2014 may be implemented as an integral part of the processor 2004, or it may be implemented as separate component.

In examples, the system memory 2006 may be of any suitable type such as non-volatile memory (e.g. flash memory or read only memory), volatile memory (such as random access memory (RAM)), and/or a combination of volatile and non-volatile memory. In examples, the system memory 2006 may be arranged to store code for execution by the processor 2004 and/or data related to the execution. For example, the system memory may store operating system code 2018, application code 2020, and program data 2022. In examples, the application code 2020 may comprise code to implement one or more of the example methods described herein, for examples to implement the steps described above with reference to FIG. 1 or 3. The application code 2020 may be arranged to cooperate with the program data 2022 or other media, for example to allow input of thin section images, or training data.

In examples, the computing device 2000 may have additional features, functionality or interfaces. For example main unit 2002 may cooperate with one or more peripheral devices for example to implement the methods described herein. In examples, the computing device 2000 comprises, as peripheral devices, an output interface 2024, a peripheral interface 2026, a storage device 208, and a communication module 2030. In examples, the computing device comprises an interface bus 2032 arranged to facilitate communication between the main unit 2002 and the peripheral devices.

In examples, the output device 2024 may comprise output devices such as a graphical processing unit (GPU) 2034 and audio output unit 2036 for example arranged to be able to communicate with external devices such as a display, and/or loudspeaker, via one or more suitable ports such as audio/video (A/V) port. In examples, the peripheral interface 2026 may comprise a serial interface 2038, a parallel interface 2040, and a input/output port(s) 2042 which may be operable to cooperate with the main unit 2002 to allow communication with one or more external input and/or output devices via the I/O port 2042. For example, the I/O port 2042 may communication with one or more input devices such as a keyboard, mouse, touch pad, voice input device, scanner, imaging capturing device, video camera, and the like, and/or with one or more output devices such as a 2D printer (e.g. paper printer), or 3D printer, or other suitable output device. For example, thin section images may be received via the I/O port 2042 from a suitable imaging device.

In examples, the storage device may comprise removable storage media 2044 and/or non-removable storage media 2046. For example, the removable storage media may be random access memory (RAM), electrically erasable programmable read only memory (EEPROM), read only memory (ROM) flash memory, or other memory technology, optical storage media such as compact disc (CD) digital versatile disc (DVD) or other optical storage media, magnetic storage media such as floppy disc, magnetic tape, or other magnetic storage media. However, it will be appreciated that any suitable type of removable storage media could be used. Non-removable storage media 2046 may comprise a magnetic storage media such as a hard disk drive, or solid state hard drive, or other suitable media, although it will be appreciated that any suitable non-removable storage media could be used. The storage device 2028 may allow access by the main unit 2002 for example to implement the methods described herein.

In examples, the communication module may comprise a wireless communication module 2048 and a wired communication module 2050. For example, the wireless communication module may be arranged to communicate wirelessly via a suitable wireless communication standard for example relating to wifi, Bluetooth, near field communication, optical communication (such as infrared), acoustic communication, or via a suitable mobile telecommunications standard. The wired communication module may allow communication via a wired or optical link for example by Ethernet or optical cable. However, it will be appreciated that any suitable communication module could be used.

Referring to FIG. 2, the image data input module 102 may for example be implemented via the peripheral interface 2026 and/or the storage device 2028 in cooperation with the main unit 2002, for example based on image input that is input via the I/O port 2042 and/or from images stored in the storage device 2028. In other examples, the main unit 2002 may receive data such as image data from the image data input module 102 (e.g. comprising an automated thin section scanner and/or microscope) via the peripheral interface 2026 and/or the communication module 2030.

In examples, one or more of the classifying module 104, salient feature extraction module 106, the semantic text processing module 108, and the search module 110 may be implemented by the main unit 2002, although it will be appreciated that other suitable implementations could be used. In examples, the output module 112 may be implemented by the main unit 2002 in cooperation with the output device 2024, although it will be appreciated that other suitable implementations could be used.

It will be appreciated that in examples of the disclosure, elements of the disclosed methods may be implemented in a computing device (such as the computing device described above with reference to FIG. 22) in any suitable manner. For example, a conventional computing device may be adapted to perform one or more of the methods described herein by programming/adapting one or more processors of the computing device. As such, in examples, the programming/adapting may be implemented in the form of a computer program product comprising computer implementable instructions stored on a data carrier and/or carried by a signal bearing medium, such as floppy disk, hard disk, optical disk, solid state drive, flash memory, programmable read only memory (PROM), random access memory (RAM), or any combination of these or other storage media or signal bearing medium, or transmitted via a network such as a wireless network, Ethernet, the internet, or any other combination of these or other networks. In other words, in examples, a computer program may comprise computer readable instructions which, when implemented on a computer, cause the computer to carry out a method according examples of the disclosure. In examples, a storage medium may comprise the computer program, for example, as mentioned above. It will also be appreciated that other suitable computer architectures could be used such as those based on one or more parallel processors. Furthermore, at least some processing may be implemented on one or more graphical processing units (GPUs) as is known in the field of neural network processing.

Based on the techniques described herein, the skilled person would appreciate that examples may allow thin section image recognition to be linked to or associated with laboratory measured rock properties (such as porosity, permeability, grain density (a proxy for lithology), capillary pressure, pore throat distribution, relative permeability, formation resistivity factor (FRF) and oil saturation remaining). Examples of the disclosure may allow a brief, machine written textural description to be generated for a given rock 2D thin section image. The described examples may implement computer vision technology to classify carbonate reservoir(s) based on one of several carbonate rock classification systems and to help identify image content. Examples may utilise a Recurrent Neural Network (RNN) (for example as described above with reference to FIG. 6) trained with a task specific technical word vocabulary to convert the image understanding into right order descriptive words.

Although a variety of examples have been described herein, these are provided by way of example only and many variations and modifications on such examples will be apparent to the skilled person and fall within the spirit and scope of the present invention, which is defined by the appended claims and their equivalents.

The invention claimed is:

1. An automated method for categorizing and describing thin sections of reservoir rock samples obtained from carbonate rocks, the method comprising:

capturing, using an input image data module, optical or microscopic images of one or more thin sections of one or more input rock samples obtained from reservoir carbonate rocks so as to generate input rock image data;

classifying, using a classifying module based on a trained convolutional neural network generated from supervised learning, the one or more input rock samples into lithological and quality categories of carbonate thin sections by applying convolutional neural network processing to the input rock image data to identify one or more attributes of the input rock samples;

extracting, using a trained salient feature extraction module based on a trained convolution deconvolution neural network, salient features from the one or more attributes of the input rock samples so as to generate salient feature data;

applying, using a semantic text processing module based on a trained recurrent neural network generated from supervised learning, semantic text processing to the salient feature data using learned associations between salient-feature data and geological descriptive terminology so as to generate input rock sample text data indicative of the one or more attributes of the input rock samples;

storing, using a storage module, the input rock sample text data;

searching, using a search module, a rock image database for categorized images that are similar to the captured images based on the stored rock sample text data and database text data associated with the categorized images stored in the rock image database, in which the rock image database comprises categorized images of categorized rock samples and the database text data, and the database text data is indicative of one or more attributes of the categorized rock samples and is associated with petrophysical measurements of the categorized rock samples; and generating output data dependent upon a degree of similarity between the rock sample text data and the database text data so that the output data indicates petrophysical properties of the carbonate rocks associated with the thin sections of input rock samples that are identified as being within a selected degree of similarity to the categorized rock samples in the rock image database based on a comparison of the stored rock sample text data with the database text data, and in which the output data is based on the petrophysical measurements of the categorized rock samples identified as being within a selected degree of similarity to the input rock samples.

2. The method according to claim 1, in which the output data comprises a textual description of the petrophysical properties of the input rock sample.

3. The method according to claim 1, in which extracting the salient features comprises performing image semantic segmentation using deconvolution neural network processing.

4. The method according to claim 1, in which the semantic text processing comprises applying recurrent neural network processing to the salient feature data.

5. The method according to claim 4, in which the recurrent neural network processing comprises applying a long short term memory (LTSM) stacked network to the salient feature data to generate a textual summary of image content of the image data.

6. The method according to claim 1, in which the degree of similarity is user selectable.

7. The method according to claim 1, in which the convolutional neural network comprises using an intermediate layer between two convolutional layers.

8. The method according to claim 7, in which the intermediate layer comprises using a rectified linear units (ReLU) nonlinear activation function.

9. The method according to claim 7, in which the convolutional neural network processing comprising using two or more of: a convolution layer; a max pooling layer; and a fully connected layer.

10. The method according to claim 7, in which the intermediate layer comprises a max pooling layer.

11. The method according to claim 1, comprising:

generating a labelled image training database based on observing and labelling a plurality of carbonate reservoir rock samples including providing qualitative assessment of salient feature abundance;

generating a semantic text training database comprising text data comprising text data relating to descriptions of carbonate reservoir rock samples;

generating a measured rock properties database comprising rock property data associated with labelled and unlabeled rock training images;

generating the trained convolutional neural network for the classifying module by using supervised learning based on a first subset of the labelled image training database so as to classify the rock training images;

generating the trained convolution deconvolution neural network for the trained salient feature extraction module using supervised learning based on a second subset of the labelled image training database so as to recognize carbonate reservoir rock features and their abundance; and generating the trained recurrent neural network for the semantic text processing module by using supervised learning based on seed words from the trained convolutional neural network and the trained convolution deconvolution neural network.

12. A non-transitory computer-readable medium storing a computer program comprising computer readable instructions which, when executed by one or more processors, cause the one or more processors to:

capture, using an input image data module, images of one or more thin sections of one or more input rock samples obtained from reservoir carbonate rocks so as to generate input rock image data;

classify, using a classifying module based on a trained convolutional neural network generated from supervised learning, the one or more input rock samples by applying convolutional neural network processing to the input rock image data to identify one or more attributes of the input rock samples;

extract, using a trained salient feature extraction module based on a trained convolution deconvolution neural network, salient features from the one or more attributes of the input rock samples so as to generate salient feature data;

apply, using a semantic text processing module based on a trained recurrent neural network generated from supervised learning, semantic text processing to the salient feature data so as to generate input rock sample text data indicative of the one or more attributes of the input rock samples;

store, using a storage module, the input rock sample text data;

search, using a search module, a rock image database for categorized images that are similar to the captured images based on the stored rock sample text data and database text data associated with the categorized images stored in the rock image database, in which the rock image database comprises categorized images of categorized rock samples and the database text data, and the database text data is indicative of one or more attributes of the categorized rock samples and is associated with petrophysical measurements of the categorized rock samples; and generate output data dependent upon a degree of similarity between the rock sample text data and the database text data so that the output data indicates petrophysical properties of the carbonate rocks associated with the thin sections of input rock samples that are identified as being within a selected degree of similarity to the categorized rock samples in the rock image database based on a comparison of the stored rock sample text data with the database text data, and in which the output data is based on the petrophysical measurements of the categorized rock samples identified as being within a selected degree of similarity to the input rock samples.

13. The non-transitory computer-readable medium of claim 12, wherein the computer-executable instructions further cause the one or more processors to:

apply recurrent neural network processing to the salient feature data, wherein the recurrent neural network processing comprises applying a long short term memory (LTSM) stacked network to the salient feature data to generate a textual summary of image content of the image data.

14. An automated system for categorizing and describing thin sections of reservoir rock samples obtained from carbonate rocks, the system comprising a processor in communication with memory storing instructions executable by the processor to:

capture optical or microscopic images of one or more thin sections of one or more input rock samples obtained from reservoir carbonate rocks so as to generate input rock image data;

classify, based on a trained convolution neural network generated from supervised learning, the one or more rock samples into lithological and quality categories of carbonate thin sections by applying convolutional neural network processing to the input rock image data to identify one or more attributes of the rock samples;

extract, based on a trained convolution deconvolution neural network, salient features from the one or more attributes of the rock samples so as to generate salient feature data;

apply semantic text processing, based on a trained recurrent neural network generated from supervised learning, to the salient feature data using learned associations between salient-feature data and geological descriptive terminology so as to generate input rock sample text data indicative of the one or more attributes of the rock samples;

store the input rock sample text data in a storage module;

search a rock image database for categorized images that are similar to the captured images based on the stored rock sample text data and database text data associated with the categorized images stored in the rock image database, in which the rock image database comprises categorized images of categorized rock samples and the database text data, and the database text data is indicative of one or more attributes of the categorized rock samples and is associated with petrophysical measurements of the categorized rock samples; and generate output data dependent upon a degree of similarity between the rock sample text data and the database text data so that the output data indicates petrophysical properties of the carbonate rocks associated with the thin sections of input rock samples that are identified as being within a selected degree of similarity to the categorized rock samples in the rock image database based on a comparison of the stored rock sample text data with the database text data, and in which the output data is based on the petrophysical measurements of the categorized rock samples identified as being within a selected degree of similarity to the input rock samples.

\* \* \* \* \*